US 8,249,145 B2

(12) United States Patent  
Chang et al.

(10) Patent No.: US 8,249,145 B2  
(45) Date of Patent: Aug. 21, 2012

(54) ESTIMATING SAMPLE-DOMAIN DISTORTION IN THE TRANSFORM DOMAIN WITH ROUNDING COMPENSATION

(75) Inventors: Cheng Chang, Redmond, WA (US); Chih-Lung B. Lin, Redmond, WA (US); Shankar Regunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/248,784

(22) Filed: Sep. 29, 2011

(65) Prior Publication Data

US 2012/0020409 A1   Jan. 26, 2012

Related U.S. Application Data

(63) Continuation of application No. 11/400,719, filed on Apr. 27, 2006, now Pat. No. 8,059,721.

(51) Int. Cl.  
*H04N 7/12* (2006.01)

(52) U.S. Cl. .................................. 375/240.01

(58) Field of Classification Search ............. 375/240.01, 375/240.03, 240.16, 240.18; 382/239, 244, 382/250

See application file for complete search history.

(56) References Cited

U.S. PATENT DOCUMENTS

| | | | |
|---|---|---|---|
| 762,026 | A | 6/1904 | Connstein |
| 4,583,114 | A | 4/1986 | Catros |
| 4,679,079 | A | 7/1987 | Catros et al. |
| 4,774,574 | A | 9/1988 | Daly et al. |
| 4,821,119 | A | 4/1989 | Gharavi |
| 4,862,264 | A | 8/1989 | Wells et al. |
| 4,965,830 | A | 10/1990 | Barham et al. |
| 4,992,889 | A | 2/1991 | Yamagami et al. |
| 5,072,295 | A | 12/1991 | Murakami et al. |
| 5,128,758 | A | 7/1992 | Azadegan et al. |
| 5,136,377 | A | 8/1992 | Johnston et al. |
| 5,144,426 | A | 9/1992 | Tanaka et al. |

(Continued)

FOREIGN PATENT DOCUMENTS

CA   1327074   2/1994

(Continued)

OTHER PUBLICATIONS

Atzori et al., "Adaptive Anisotropic Filtering (AAF) for Real-Time Visual Enhancement of MPEG-Coded Video Sequences," IEEE Transactions on Circuits and Systems for Video Technology, vol. 12, No. 5, pp. 285-298 (May 2002).

(Continued)

*Primary Examiner* — Leon-Viet Nguyen  
(74) *Attorney, Agent, or Firm* — Klarquist Sparkman, LLP

(57) ABSTRACT

Techniques and tools are described for compensating for rounding when estimating sample-domain distortion in the transform domain. For example, a video encoder estimates pixel-domain distortion in the transform domain for a block of transform coefficients after compensating for rounding in the DC coefficient of the block. In this way, the video encoder improves the accuracy of pixel-domain distortion estimation but retains the computational advantages of performing the estimation in the transform domain. Rounding compensation includes, for example, looking up an index (from a de-quantized transform coefficient) in a rounding offset table to determine a rounding offset, then adjusting the coefficient by the offset. Other techniques and tools described herein are directed to creating rounding offset tables and encoders that make encoding decisions after considering rounding effects that occur after an inverse frequency transform on de-quantized transform coefficient values.

13 Claims, 8 Drawing Sheets

U.S. PATENT DOCUMENTS

| | | | |
|---|---|---|---|
| 5,146,324 | A | 9/1992 | Miller et al. |
| 5,179,442 | A | 1/1993 | Azadegan et al. |
| 5,237,410 | A | 8/1993 | Inoue |
| 5,241,395 | A | 8/1993 | Chen |
| 5,253,058 | A | 10/1993 | Gharavi |
| 5,263,088 | A * | 11/1993 | Hazu et al. .................. 704/229 |
| 5,301,242 | A | 4/1994 | Gonzales et al. |
| 5,303,058 | A | 4/1994 | Fukuda et al. |
| 5,317,396 | A | 5/1994 | Fujinami |
| 5,317,672 | A | 5/1994 | Crossman et al. |
| 5,333,212 | A | 7/1994 | Ligtenberg |
| 5,351,310 | A | 9/1994 | Califano et al. |
| 5,374,958 | A | 12/1994 | Yanagihara |
| 5,412,429 | A | 5/1995 | Glover |
| 5,452,104 | A | 9/1995 | Lee |
| 5,461,421 | A | 10/1995 | Moon |
| 5,473,377 | A | 12/1995 | Kim |
| 5,481,553 | A | 1/1996 | Suzuki et al. |
| 5,506,916 | A | 4/1996 | Nishihara et al. |
| 5,510,785 | A | 4/1996 | Segawa et al. |
| 5,537,440 | A | 7/1996 | Eyuboglu et al. |
| 5,537,493 | A | 7/1996 | Wilkinson |
| 5,539,469 | A | 7/1996 | Jung |
| 5,559,557 | A | 9/1996 | Kato |
| 5,565,920 | A | 10/1996 | Lee et al. |
| 5,587,708 | A | 12/1996 | Chiu |
| 5,606,371 | A | 2/1997 | Gunnewiek et al. |
| 5,623,424 | A | 4/1997 | Azadegan et al. |
| 5,631,644 | A | 5/1997 | Katata et al. |
| 5,654,760 | A | 8/1997 | Ohtsuki |
| 5,657,087 | A | 8/1997 | Jeong et al. |
| 5,663,763 | A | 9/1997 | Yagasaki et al. |
| 5,724,097 | A | 3/1998 | Hibi et al. |
| 5,724,456 | A | 3/1998 | Boyack et al. |
| 5,731,836 | A | 3/1998 | Lee |
| 5,731,837 | A | 3/1998 | Hurst, Jr. |
| 5,739,861 | A | 4/1998 | Music |
| 5,751,358 | A | 5/1998 | Suzuki et al. |
| 5,751,379 | A | 5/1998 | Markandey et al. |
| 5,761,088 | A | 6/1998 | Hulyalkar et al. |
| 5,764,803 | A | 6/1998 | Jacquin et al. |
| 5,781,788 | A | 7/1998 | Woo et al. |
| 5,786,856 | A | 7/1998 | Hall et al. |
| 5,802,213 | A | 9/1998 | Gardos |
| 5,809,178 | A | 9/1998 | Anderson et al. |
| 5,815,097 | A | 9/1998 | Schwartz et al. |
| 5,819,035 | A | 10/1998 | Devaney et al. |
| 5,825,310 | A | 10/1998 | Tsutsui |
| 5,835,145 | A | 11/1998 | Ouyang et al. |
| 5,835,237 | A | 11/1998 | Ebrahimi |
| 5,844,613 | A | 12/1998 | Chaddha |
| 5,850,482 | A | 12/1998 | Meany et al. |
| 5,867,167 | A | 2/1999 | Deering |
| 5,870,435 | A | 2/1999 | Choi et al. |
| 5,877,813 | A | 3/1999 | Lee et al. |
| 5,878,166 | A | 3/1999 | Legall |
| 5,880,775 | A | 3/1999 | Ross |
| 5,883,672 | A | 3/1999 | Suzuki et al. |
| 5,926,791 | A | 7/1999 | Ogata et al. |
| 5,969,764 | A | 10/1999 | Sun et al. |
| 5,970,173 | A | 10/1999 | Lee et al. |
| 5,990,957 | A | 11/1999 | Ryoo |
| 6,044,115 | A | 3/2000 | Horiike et al. |
| 6,049,630 | A | 4/2000 | Wang et al. |
| 6,058,362 | A | 5/2000 | Malvar |
| 6,072,831 | A | 6/2000 | Chen |
| 6,084,636 | A | 7/2000 | Fujiwara et al. |
| 6,088,392 | A | 7/2000 | Rosenberg |
| 6,091,777 | A | 7/2000 | Guetz et al. |
| 6,104,751 | A | 8/2000 | Artieri |
| 6,118,817 | A | 9/2000 | Wang |
| 6,118,903 | A | 9/2000 | Liu |
| 6,125,140 | A | 9/2000 | Wilkinson |
| 6,148,107 | A | 11/2000 | Ducloux et al. |
| 6,148,109 | A | 11/2000 | Boon et al. |
| 6,160,846 | A | 12/2000 | Chiang et al. |
| 6,167,091 | A | 12/2000 | Okada et al. |
| 6,182,034 | B1 | 1/2001 | Malvar |
| 6,212,232 | B1 | 4/2001 | Reed et al. |
| 6,215,905 | B1 | 4/2001 | Lee et al. |
| 6,223,162 | B1 | 4/2001 | Chen et al. |
| 6,240,135 | B1 | 5/2001 | Kim |
| 6,240,380 | B1 | 5/2001 | Malvar |
| 6,243,497 | B1 | 6/2001 | Chiang et al. |
| 6,249,614 | B1 | 6/2001 | Bocharova et al. |
| 6,256,422 | B1 | 7/2001 | Mitchell et al. |
| 6,256,423 | B1 | 7/2001 | Krishnamurthy et al. |
| 6,263,022 | B1 | 7/2001 | Chen et al. |
| 6,263,024 | B1 | 7/2001 | Matsumoto |
| 6,275,614 | B1 | 8/2001 | Krishnamurthy et al. |
| 6,278,735 | B1 | 8/2001 | Mohsenian |
| 6,292,588 | B1 | 9/2001 | Shen et al. |
| 6,314,208 | B1 | 11/2001 | Konstantinides et al. |
| 6,337,881 | B1 | 1/2002 | Chaddha |
| 6,347,116 | B1 | 2/2002 | Haskell et al. |
| 6,348,945 | B1 | 2/2002 | Hayakawa |
| 6,356,709 | B1 | 3/2002 | Abe et al. |
| 6,359,928 | B1 | 3/2002 | Wang et al. |
| 6,360,017 | B1 | 3/2002 | Chiu et al. |
| 6,370,502 | B1 | 4/2002 | Wu et al. |
| 6,373,894 | B1 | 4/2002 | Florencio et al. |
| 6,385,343 | B1 | 5/2002 | Kuroda et al. |
| 6,389,171 | B1 | 5/2002 | Washington |
| 6,393,155 | B1 | 5/2002 | Bright et al. |
| 6,408,026 | B1 | 6/2002 | Tao |
| 6,418,166 | B1 | 7/2002 | Wu et al. |
| 6,438,167 | B1 | 8/2002 | Shimizu et al. |
| 6,456,744 | B1 | 9/2002 | Lafe |
| 6,463,100 | B1 | 10/2002 | Cho et al. |
| 6,466,620 | B1 | 10/2002 | Lee |
| 6,473,534 | B1 | 10/2002 | Merhav et al. |
| 6,490,319 | B1 | 12/2002 | Yang |
| 6,493,385 | B1 | 12/2002 | Sekiguchi et al. |
| 6,519,284 | B1 | 2/2003 | Pesquet-Popescu et al. |
| 6,526,096 | B2 | 2/2003 | Lainema et al. |
| 6,546,049 | B1 | 4/2003 | Lee |
| 6,571,019 | B1 | 5/2003 | Kim et al. |
| 6,593,925 | B1 | 7/2003 | Hakura et al. |
| 6,600,836 | B1 | 7/2003 | Thyagarajan et al. |
| 6,647,152 | B2 | 11/2003 | Willis et al. |
| 6,654,417 | B1 | 11/2003 | Hui |
| 6,678,422 | B1 | 1/2004 | Sharma et al. |
| 6,687,294 | B2 | 2/2004 | Yan et al. |
| 6,704,718 | B2 | 3/2004 | Burges et al. |
| 6,721,359 | B1 | 4/2004 | Bist et al. |
| 6,728,317 | B1 | 4/2004 | Demos |
| 6,731,811 | B1 | 5/2004 | Rose |
| 6,738,423 | B1 | 5/2004 | Lainema et al. |
| 6,747,660 | B1 | 6/2004 | Olano et al. |
| 6,759,999 | B1 | 7/2004 | Doyen |
| 6,760,482 | B1 | 7/2004 | Taubman |
| 6,765,962 | B1 | 7/2004 | Lee et al. |
| 6,771,830 | B2 | 8/2004 | Goldstein et al. |
| 6,785,331 | B1 | 8/2004 | Jozawa et al. |
| 6,788,740 | B1 | 9/2004 | Van der Schaar et al. |
| 6,792,157 | B1 | 9/2004 | Koshi et al. |
| 6,795,584 | B2 | 9/2004 | Karczewicz et al. |
| 6,801,572 | B2 | 10/2004 | Yamada et al. |
| 6,807,317 | B2 | 10/2004 | Mathew et al. |
| 6,810,083 | B2 | 10/2004 | Chen et al. |
| 6,831,947 | B2 | 12/2004 | Ribas Corbera |
| 6,862,320 | B1 | 3/2005 | Isu et al. |
| 6,865,291 | B1 | 3/2005 | Zador |
| 6,873,654 | B1 | 3/2005 | Rackett |
| 6,876,703 | B2 | 4/2005 | Ismaeil et al. |
| 6,882,753 | B2 | 4/2005 | Chen et al. |
| 6,907,142 | B2 | 6/2005 | Kalevo et al. |
| 6,909,745 | B1 | 6/2005 | Puri et al. |
| 6,947,045 | B1 | 9/2005 | Ostermann et al. |
| 6,975,680 | B2 | 12/2005 | Demos |
| 6,977,659 | B2 | 12/2005 | Dumitras et al. |
| 6,990,242 | B2 | 1/2006 | Malvar |
| 7,016,546 | B2 | 3/2006 | Fukuhara et al. |
| 7,020,204 | B2 | 3/2006 | Auvray et al. |
| 7,027,506 | B2 | 4/2006 | Lee et al. |
| 7,027,507 | B2 | 4/2006 | Wu |
| 7,035,473 | B1 | 4/2006 | Zeng et al. |

| | | | | | | |
|---|---|---|---|---|---|---|
| 7,042,941 B1 | 5/2006 | Laksono et al. | | 2005/0135484 A1 | 6/2005 | Lee et al. |
| 7,058,127 B2 | 6/2006 | Lu et al. | | 2005/0147163 A1 | 7/2005 | Li et al. |
| 7,099,389 B1 | 8/2006 | Yu et al. | | 2005/0152451 A1 | 7/2005 | Byun |
| 7,110,455 B2 | 9/2006 | Wu et al. | | 2005/0180500 A1 | 8/2005 | Chiang et al. |
| 7,162,096 B1 | 1/2007 | Horowitz | | 2005/0180502 A1 | 8/2005 | Puri |
| 7,200,277 B2 | 4/2007 | Joshi et al. | | 2005/0190836 A1 | 9/2005 | Lu et al. |
| 7,289,154 B2 | 10/2007 | Gindele | | 2005/0207492 A1 | 9/2005 | Pao |
| 7,295,609 B2 | 11/2007 | Sato et al. | | 2005/0232501 A1 | 10/2005 | Mukerjee |
| 7,301,999 B2 | 11/2007 | Filippini et al. | | 2005/0238096 A1 | 10/2005 | Holcomb et al. |
| 7,307,639 B1 | 12/2007 | Dumitras et al. | | 2005/0254719 A1 | 11/2005 | Sullivan |
| 7,356,085 B2 | 4/2008 | Gavrilescu et al. | | 2005/0259729 A1 | 11/2005 | Sun |
| 7,463,780 B2 | 12/2008 | Fukuhara et al. | | 2005/0276493 A1 | 12/2005 | Xin et al. |
| 7,471,830 B2 | 12/2008 | Lim et al. | | 2006/0013307 A1 | 1/2006 | Olivier et al. |
| 7,580,584 B2 | 8/2009 | Holcomb et al. | | 2006/0013309 A1 | 1/2006 | Ha et al. |
| 7,738,554 B2 | 6/2010 | Lin et al. | | 2006/0018552 A1 | 1/2006 | Malayath et al. |
| 7,778,476 B2 | 8/2010 | Alvarez et al. | | 2006/0034368 A1 | 2/2006 | Klivington |
| 7,801,383 B2 | 9/2010 | Sullivan | | 2006/0038826 A1 | 2/2006 | Daly |
| 7,869,517 B2 | 1/2011 | Ghanbari | | 2006/0071825 A1 | 4/2006 | Demos |
| 7,889,790 B2 | 2/2011 | Sun | | 2006/0083308 A1 | 4/2006 | Schwarz et al. |
| 7,995,649 B2 | 8/2011 | Zuo et al. | | 2006/0088098 A1 | 4/2006 | Vehvilainen |
| 2001/0048718 A1 | 12/2001 | Bruls et al. | | 2006/0098733 A1 | 5/2006 | Matsumura et al. |
| 2002/0021756 A1 | 2/2002 | Jayant et al. | | 2006/0104350 A1 | 5/2006 | Liu |
| 2002/0044602 A1 | 4/2002 | Ohki | | 2006/0104527 A1* | 5/2006 | Koto et al. ............ 382/239 |
| 2002/0118748 A1 | 8/2002 | Inomata et al. | | 2006/0126724 A1 | 6/2006 | Cote |
| 2002/0118884 A1 | 8/2002 | Cho et al. | | 2006/0126728 A1 | 6/2006 | Yu et al. |
| 2002/0136297 A1 | 9/2002 | Shimada et al. | | 2006/0133478 A1 | 6/2006 | Wen |
| 2002/0136308 A1 | 9/2002 | Le Maguet et al. | | 2006/0133479 A1 | 6/2006 | Chen et al. |
| 2002/0154693 A1 | 10/2002 | Demos et al. | | 2006/0140267 A1 | 6/2006 | He et al. |
| 2002/0186890 A1 | 12/2002 | Lee et al. | | 2006/0165176 A1 | 7/2006 | Raveendran et al. |
| 2003/0021482 A1 | 1/2003 | Lan et al. | | 2006/0197777 A1 | 9/2006 | Cha et al. |
| 2003/0053702 A1 | 3/2003 | Hu | | 2006/0227868 A1 | 10/2006 | Chen et al. |
| 2003/0095599 A1 | 5/2003 | Lee et al. | | 2006/0238444 A1 | 10/2006 | Wang et al. |
| 2003/0103677 A1 | 6/2003 | Tastl et al. | | 2006/0239576 A1 | 10/2006 | Mukherjee |
| 2003/0108100 A1 | 6/2003 | Sekiguchi et al. | | 2006/0245506 A1 | 11/2006 | Lin et al. |
| 2003/0113026 A1 | 6/2003 | Srinivasan et al. | | 2006/0256851 A1 | 11/2006 | Wang et al. |
| 2003/0128754 A1 | 7/2003 | Akimoto et al. | | 2006/0256867 A1 | 11/2006 | Turaga et al. |
| 2003/0128756 A1 | 7/2003 | Oktem | | 2006/0257037 A1 | 11/2006 | Samadani |
| 2003/0138150 A1 | 7/2003 | Srinivasan | | 2006/0268990 A1 | 11/2006 | Lin et al. |
| 2003/0185420 A1 | 10/2003 | Sefcik et al. | | 2007/0002946 A1 | 1/2007 | Bouton et al. |
| 2003/0194010 A1 | 10/2003 | Srinivasan et al. | | 2007/0009039 A1 | 1/2007 | Ryu |
| 2003/0206582 A1* | 11/2003 | Srinivasan et al. ....... 375/240.01 | | 2007/0009042 A1 | 1/2007 | Craig et al. |
| 2003/0215011 A1 | 11/2003 | Wang et al. | | 2007/0053603 A1 | 3/2007 | Monro |
| 2003/0219073 A1 | 11/2003 | Lee et al. | | 2007/0081586 A1 | 4/2007 | Raveendran et al. |
| 2003/0223493 A1 | 12/2003 | Ye et al. | | 2007/0081588 A1 | 4/2007 | Raveendran et al. |
| 2003/0235247 A1 | 12/2003 | Wu et al. | | 2007/0140333 A1 | 6/2007 | Chono et al. |
| 2004/0008901 A1 | 1/2004 | Avinash | | 2007/0147497 A1 | 6/2007 | Bao et al. |
| 2004/0022316 A1 | 2/2004 | Ueda et al. | | 2007/0160138 A1 | 7/2007 | Wedi et al. |
| 2004/0036692 A1 | 2/2004 | Alcorn et al. | | 2007/0160151 A1 | 7/2007 | Bolton et al. |
| 2004/0090397 A1 | 5/2004 | Doyen et al. | | 2007/0189626 A1 | 8/2007 | Tanizawa et al. |
| 2004/0091168 A1 | 5/2004 | Jones et al. | | 2007/0201553 A1 | 8/2007 | Shindo |
| 2004/0151243 A1 | 8/2004 | Bhaskaran et al. | | 2007/0230565 A1 | 10/2007 | Tourapis et al. |
| 2004/0158719 A1 | 8/2004 | Lee et al. | | 2007/0237221 A1 | 10/2007 | Hsu et al. |
| 2004/0190610 A1 | 9/2004 | Song et al. | | 2007/0237222 A1 | 10/2007 | Xia et al. |
| 2004/0202376 A1* | 10/2004 | Schwartz et al. ............ 382/244 | | 2007/0237236 A1 | 10/2007 | Chang et al. |
| 2004/0228406 A1 | 11/2004 | Song | | 2007/0237237 A1 | 10/2007 | Chang et al. |
| 2004/0264568 A1 | 12/2004 | Florencio | | 2007/0248163 A1 | 10/2007 | Zuo et al. |
| 2004/0264580 A1 | 12/2004 | Chiang Wei Yin et al. | | 2007/0248164 A1 | 10/2007 | Zuo et al. |
| 2005/0002575 A1 | 1/2005 | Joshi et al. | | 2007/0258518 A1 | 11/2007 | Tu et al. |
| 2005/0008075 A1 | 1/2005 | Chang et al. | | 2007/0258519 A1 | 11/2007 | Srinivasan |
| 2005/0013365 A1 | 1/2005 | Mukerjee et al. | | 2008/0068446 A1 | 3/2008 | Barkley et al. |
| 2005/0013497 A1 | 1/2005 | Hsu et al. | | 2008/0080615 A1 | 4/2008 | Tourapis et al. |
| 2005/0013498 A1 | 1/2005 | Srinivasan et al. | | 2008/0089410 A1 | 4/2008 | Lu et al. |
| 2005/0013500 A1 | 1/2005 | Lee et al. | | 2008/0101465 A1 | 5/2008 | Chono et al. |
| 2005/0015246 A1 | 1/2005 | Thumpudi et al. | | 2008/0187042 A1 | 8/2008 | Jasinschi |
| 2005/0015259 A1 | 1/2005 | Thumpudi et al. | | 2008/0192822 A1 | 8/2008 | Chang et al. |
| 2005/0024487 A1 | 2/2005 | Chen | | 2008/0240235 A1 | 10/2008 | Holcomb et al. |
| 2005/0031034 A1 | 2/2005 | Kamaci et al. | | 2008/0240250 A1 | 10/2008 | Lin et al. |
| 2005/0036698 A1 | 2/2005 | Beom | | 2008/0240257 A1 | 10/2008 | Chang et al. |
| 2005/0036699 A1 | 2/2005 | Holcomb et al. | | 2008/0260278 A1 | 10/2008 | Zuo et al. |
| 2005/0041738 A1 | 2/2005 | Lin et al. | | 2008/0304562 A1 | 12/2008 | Chang et al. |
| 2005/0052294 A1 | 3/2005 | Liang et al. | | 2009/0213930 A1 | 8/2009 | Ye et al. |
| 2005/0053151 A1 | 3/2005 | Lin et al. | | 2009/0245587 A1 | 10/2009 | Holcomb et al. |
| 2005/0053158 A1 | 3/2005 | Regunathan et al. | | 2009/0290635 A1 | 11/2009 | Kim et al. |
| 2005/0084009 A1 | 4/2005 | Furukawa et al. | | 2009/0296808 A1 | 12/2009 | Regunathan et al. |
| 2005/0084013 A1 | 4/2005 | Wang et al. | | 2010/0177826 A1 | 7/2010 | Bhaumik et al. |
| 2005/0094731 A1 | 5/2005 | Xu et al. | | | | |
| 2005/0105612 A1 | 5/2005 | Sung et al. | | FOREIGN PATENT DOCUMENTS | | |
| 2005/0105622 A1 | 5/2005 | Gokhale | | EP | 0932306 | 7/1999 |
| 2005/0123274 A1 | 6/2005 | Crinon et al. | | EP | 1465349 | 10/2004 |

| | | |
|---|---|---|
| EP | 1871113 | 12/2007 |
| GB | 897363 | 5/1962 |
| JP | 05-227525 | 9/1993 |
| JP | 07-222145 | 8/1995 |
| JP | 07-250327 | 9/1995 |
| JP | 08-336139 | 12/1996 |
| JP | 10-336656 | 12/1998 |
| JP | 11-041610 | 2/1999 |
| JP | 2003061090 | 2/2003 |
| JP | 6-296275 | 10/2004 |
| JP | 2007-281949 | 10/2007 |
| KR | 132895 | 10/1998 |
| WO | WO 97/21302 | 6/1997 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2005/076614 | 8/2005 |
| WO | WO 2006/075895 | 7/2006 |
| WO | WO 2006/112620 | 10/2006 |
| WO | WO 2007/015047 | 2/2007 |
| WO | WO 2007/130580 | 11/2007 |

OTHER PUBLICATIONS

Augustine et al., "Region of Interest Editing of MPEG-2 Video Streams in the Compressed Domain," 2004 IEEE Int'l Conf. on Multimedia and Expo: ICME'04, vol. 1, Issue 27-30, pp. 559-562 (Jun. 2004).
Bist et al., "Adaptive Quantization for Low Bit Rate Video Coding," Proc. 1998 Int'l Conf. on Image Processing (ICIP 98), pp. 925-928 (Oct. 1998).
Calderbank et al., "Wavelet transforms that map integers to integers," Mathematics Subject Classification, Aug. 1996, 39 pages.
Chang et al., "Adaptive Wavelet Thresholding for Image Denoising and Compression," IEEE Trans on Image Processing, vol. 9, No. 9, pp. 1532-1546 (Sep. 2000).
Chisu, "Techniques for Accelerating Intensity-Based Rigid Image Registration," Thesis dated Jan. 15, 2005.
Chrysafis et al., "Context-based Adaptive Image Coding," Proc. of the 30th Asilomar Conf. on Signals, Systems, and Computers, 5 pp. (Nov. 1996).
De Simone, et al., "A comparative study of JPEG 2000, AVC/H.264, and HD Photo," SPIE Optics and Photonics, Applications of Digital Image Processing XXX, 12 pp. (Aug. 2007).
Donoho et al., "Data compression and Harmonic Analysis," IEEE transaction on information theory, vol. 44, No. 6, Oct. 1998, pp. 2435-2476.
Farvardin et al., "Optimum quantizer performance for a class of non-Gaussian memoryless sources," IEEE Trans. Inform. Theory, vol. IT-30, No. 3, pp. 485-497 (May 1984).
Flierl et al., "A Video Codec Incorporating Block-Based Multi-Hypothesis Motion-Compensated Prediction," in Proceedings of the SPIE Conference on Visual Communications and Image Processing, Perth, Australia, vol. 4067, pp. 238-249 (Jun. 2000).
Flierl et al., "Generalized B Pictures and the Draft H.264/AVC Video Compression Standard," in IEEE Transactions on Circuits and Systems for Video Technology, vol. 13, No. 7, pp. 587-597 (Jul. 2003).
Foos et al., "JPEG 2000 compression of medical imagery," Proc. SPIE, vol. 3980, pp. 85-96 (Feb. 2000).
Garrigues et al., "Atom position coding in a matching pursuit based video coder," Lecture Notes in Computer Science, 4 pp. (Sep. 2005).
Gavrilescu et al., "Embedded Multiple Description Scalar Quantizers," IEE Electronics Letters, vol. 39, No. 13, 12 pp. (Jun. 2003).
Gish et al., "Asymptotically efficient quantizing," IEEE Trans. Inform. Theory, vol. IT-14, No. 5 (Sep. 1968).
Golner et al., "Region Based Variable Quantization for JPEG Image Compression," IEEE Symp. on Circuits and Systems, pp. 604-607 (Aug. 2000).
Golston et al., "Video codecs tutorial: Trade-offs with H.264, VC-1 and other advanced codecs," Video/Imaging Design Line, 9 pp. (Mar. 2006).

"H.264 & IPTV Over DSL—Enabling New Telco Revenue Opportunities," White Paper, 12 pp. (May 15, 2004).
Hannuksela et al., "Sub-picture: ROI coding and unequal error protection," Proc. 2002 Int'l Conf. on Image Processing, vol. 3, Issue 24-28, pp. 537-540 (Jun. 2002).
"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (Aug. 1993).
"ISO/IEC 13818-2. Generic coding of moving pictures and associated audio information," MPEG (Moving Pictures Expert Group), International Organization for Standardization, MPEG2 Video, 23 pp. (Dec. 2000).
ISO/IEC, "Information Technology—Coding of Audio-Visual Objects: Visual, ISO/IEC 14496-2, Committee Draft," 330 pp. (Mar. 1998).
ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).
ITU-T, "ITU-T Recommendation H.261: Video Codec for Audiovisual Services at p x 64 kbits," 28 pp. (Mar. 1993).
ITU-T, "ITU-T Recommendation H.262: Information Technology—Generic Coding of Moving Pictures and Associated Audio Information: Video,"218 pp. (Jul. 1995).
ITU-T, "ITU-T Recommendation H.263: Video Coding for Low Bit Rate Communication," 167 pp. (Feb. 1998).
Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).
Joshi et al., "Comparison of generalized Gaussian and Laplacian modeling in DCT image coding," IEEE Signal Proc. Letters, vol. SPL-2, No. 5, pp. 81-82 (May 1995).
Kim et al., "Still image coding based on vector quantization and fractal approximation," IEEE Transactions on Image Processing, vol. 5, No. 4, pp. 587-597 (Apr. 1996).
Kopp, "Lossless Wavelet Based Image Compression with Adaptive 2D Decomposition," Proc. 4th Int'l Conf. in Central Europe on Computer Graphics and Visualization 96, pp. 141-149 (Feb. 12-16, 1996).
Lam et al., "A mathematical analysis of the DCT coefficient distributions for images," IEEE Trans. Image Proc., vol. IP-9, No. 10, pp. 1661-1666 (Oct. 2000).
LeGall, "MPEG: A Video Compression Standard for Multimedia Application," Communications of the ACM, vol. 34, No. 4, pp. 47-58 (Apr. 1991).
LeGall, "The MPEG Video Compression Algorithm," Signal Processing: Image Communication 4, vol. 4, No. 2, pp. 129-140 (Apr. 1992).
LeGall et al., "Transmission of HDTV signals under 140 Mbit/s using a subband decomposition and Discrete Cosine Transform coding," in Signal Processing of HDTV, Elsevier, Amsterdam, pp. 287-293 (Oct. 1988).
Lei et al., "Rate Adaptation Transcoding for Precoded Video Streams," 13 pp. (month unknown, 2000).
Limb, "A Picture-Coding Algorithm for the Merli Scan," IEEE Transactions on Communications, pp. 300-305 (Apr. 1973).
Lin et al, "Low-complexity face-assisted coding scheme for low bit rate video telephony," IEICE Trans. Inf. & Sys., vol. E86-D, No. 1, pp. 101-108 (Jan. 2003).
Lin et al, "Low-complexity face-assisted video coding," Proc. 2000 Int'l Conf. on Image Processing, vol. 2, pp. 207-210 (Sep. 2000).
Lloyd, "Least squares quantization in PCM," IEEE Trans. Inform. Theory, vol. IT-28, No. 2, pp. 7-12 (Mar. 1982) (reprint of work originally presented in Jul. 1957).
Loomis, "Using the Advanced Settings of the Windows Media Video 9 Advanced Profile Codec," 13 pp. (Document dated Apr. 2006) [Downloaded from the World Wide Web on May 31, 2007].
Lopresto et al., "Image Coding Based on Mixture Modeling of Wavelet Coefficients and a Fast Estimation-Quantization Framework," Proc. IEEE Data Compression Conference, (Snowbird, UT), pp. 221-230 (Mar. 1997).

Luo et al., "A Scene Adaptive and Signal Adaptive Quantization for Subband Image and Video Compression Using Wavelets," IEEE Trans. on Circuits and Systems for Video Tech., vol. 7, No. 2, pp. 343-357 (Apr. 1997).

Mallat, "A theory for multiresolution signal decomposition: the wavelet representation," IEEE Trans. Pattern Anal. And Machine Intell., vol. PAMI-11, No. 7, pp. 674-692 (Jul. 1989).

Masala et al., "Perceptually Optimized MPEG Compression of Synthetic Video Sequences," Proc. ICIP, pp. I-601-I-604 (Sep. 2005).

Max, "Quantizing for minimum distortion," IEEE Trans. Inform. Theory, vol. IT-6, No. 1, pp. 7-12 (Mar. 1960).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mitra et al., "Two-Stage Color Palettization for Error Diffusion," Proceedings of SPIE, pp. 207-217 (Jun. 2002).

Mook, "Next-Gen Windows Media Player Leaks to the Web," BetaNews, 17 pp. (Jul. 19, 2002) [Downloaded from the World Wide Web on Aug. 8, 2003].

Muller, "Distribution shape of two-dimensional DCT coefficients of natural images," IEE Electronics Letters, vol. 29, No. 22 (Oct. 1993).

Murakami et al., "Comparison between DPCM and Hadamard transform coding in the composite coding of the NTSC color TV signal," IEEE Trans. on Commun., vol. COM-30, No. 3, pp. 469-479 (Mar. 1982).

Musmann et al., "Advances in Picture Coding," Proceedings of the IEEE, vol. 73, No. 4, pp. 523-548 (Apr. 1985).

Neff et al., "Modulus Quantization for Matching Pursuit Video Coding," IEEE Transactions on Circuits and Systems for Video Technology, vol. 10, No. 6, pp. 895-912 (Sep. 2000).

Nguyen et al., "Set Theoretic Compression with an Application to Image Coding," IEEE Transactions on Image Processing, vol. 7, No. 7, pp. 1051-1056 (Jul. 1998).

Park et al., "A post processing method for reducing quantization effects in low bit-rate moving picture coding," IEEE Trans. Circuits Syst. Video Technology, vol. 9, pp. 161-171 (Feb. 1999).

Puri et al., "Motion-Compensated Video Coding with Adaptive Perceptual Quantization," IEEE Transactions on Circuits and Systems for Video Technology, vol. 1, No. 4, pp. 351-361 (Dec. 1991).

Radha et al., "The MPEG-4 Fine-Grained Scalable Video Coding Method for Multimedia Streaming Over IP," IEEE Trans. on Multimedia, vol. 3, No. 1, pp. 53-68 (Mar. 2001).

Reininger et al., "Distribution of two-dimensional DCT coefficients for images," IEEE Trans. on Commun., vol. COM-31, No. 6, pp. 835-839 (Jun. 1983).

Ribas Corbera et al., "Rate Control in DCT Video Coding for Low-Delay Communications," IEEE Transactions on Circuits and Systems for Video Technology, vol. 9, No. 1, pp. 172-185 (Feb. 1999).

Schallauer et al., "PRESTO—Preservation Technologies for European Broadcast Archives, D5.4—High Quality Compression for Film and Video," 80 pp. (Sep. 18, 2002).

Schuster et al., "A Theory for the Optimal Bit Allocation Between Displacement Vector Field and Displaced Frame Difference," IEEE J. on Selected Areas in Comm., vol. 15, No. 9, pp. 1739-1751 (Dec. 1997).

Shen et al., "Rate-Distortion Optimization for Fast Hierarchical B-Picture Transcoding," IEEE, pp. 5279-5282 (May 2006).

Shoushun et al., "Adaptive-Quantization Digital Image Sensor for Low-Power Image Compression," in IEEE Transactions on Circuits and Systems—I: Regular Papers, vol. 54, No. 1, pp. 13-25 (Jan. 2007).

Sony Electronics Inc., "Sony Vizaro DVD Encoder System DVA-V700," 4 pp. (Apr. 2001).

Sullivan, "Efficient scalar quantization of exponential and Laplacian random variables," IEEE Trans. Inform. Theory, vol. IT-42, No. 5, pp. 1365-1374 (Sep. 1996).

Sullivan et al., "Rate-Distortion Optimization for Video Compression," IEEE Signal Processing Magazine, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," IEEE Transactions on Circuits and Systems for Video Tech., vol. 10, No. 1, pp. 147-157 (Feb. 2000).

Tsang et al., "Fuzzy Based Rate Control for Real-Time MPEG Video," IEEE Transactions on Fuzzy Systems, pp. 504-516 (Nov. 1998).

Wang, et al., "A Framework for Adaptive Scalable Video Coding Using Wyner-Ziv Techniques," EURASIP Journal on Applied Signal Processing, pp. 1-18 (month unknown, 2006).

Watson et al., "Visibility of Wavelet Quantization Noise," IEEE Trans. on Image Processing, vol. 6, No. 8, pp. 1164-1175 (Aug. 1997).

Wien, "Variable Block-Size Transforms for Hybrid Video Coding," Dissertation, 182 pp. (Feb. 2004).

Wu et al., "Context-Based, Adaptive, Lossless Image Coding," IEEE Trans. Communications, vol. 45, pp. 437-444 (Apr. 1997).

Wu et al., "Joint Estimation of Forward and Backward Motion Vectors for Interpolative Prediction of Video," IEEE Transactions on Image Processing, vol. 3, No. 5, pp. 684-687 (Sep. 1994).

Xiong et al., "Wavelet Packet Image Coding Using Space-Frequency Quantization," IEEE Transactions on Image Processing, vol. 7, No. 6, pp. 892-898 (Jun. 1998).

Yang et al., "Rate Control for Videophone Using Local Perceptual Cues," IEEE Transactions on Circuits and Systems for Video Tech., vol. 15, No. 4, pp. 496-507 (Apr. 2005).

Yuen et al., "A survey of hybrid MC/DPCM/DCT video coding distortions," Signal Processing, vol. 70, pp. 247-278 (Nov. 1998).

Zaid et al., "Wavelet Image Coding with Adaptive Thresholding," 4 pp. (Jul. 2002).

Zhang et al., "Adaptive Field/Frame Selection for High Compression Coding," SPIE Conf. on Image and Video Communications and Processing, 13 pp. (Jan. 2003).

Chai et al., "Face Segmentation Using Skin-Color Map in Videophone Applications," IEEE Transaction on Circuits and Systems for Video Technology, vol. 9, No. 4, pp. 551-564, Jun. 1999.

Correia et al., "Classification of Video Segmentation Application Scenarios," IEEE Transactions on Circuits and Systems for Video Technology, vol. 14, No. 5, pp. 735-741, May 2004.

Daly et al., "Face-Based Visually-Optimized Image Sequence Coding," 1998 International Conference on Image Processing, vol. 3, pp. 443-447, Oct. 1998.

Lee et al., "Spatio-Temporal Model-Assisted Compatible Coding for Law and Very Low Bitrate Videotelephony," 3rd IEEE International Conference on Image Processing, 4 pages, Sep. 1996.

Malah, "Time-Domain Algorithms for Harmonic Reduction and Time Scaling of Speech Signals," IEEE Transactions on Acoustics, Speech, and Signal Processing, vol. ASSP-27, No. 2, Apr. 1979, 13 pages.

Richardson, H.264 and MPEG-4 Video Compression, pp. 50-56 and 187-196 (2003).

Eleftheriadis et al., "Dynamic Rate Shaping of Compressed Digital Video," IEEE Transactions on Multimedia, vol. 8, No. 2, Apr. 2006, pp. 297-314.

* cited by examiner

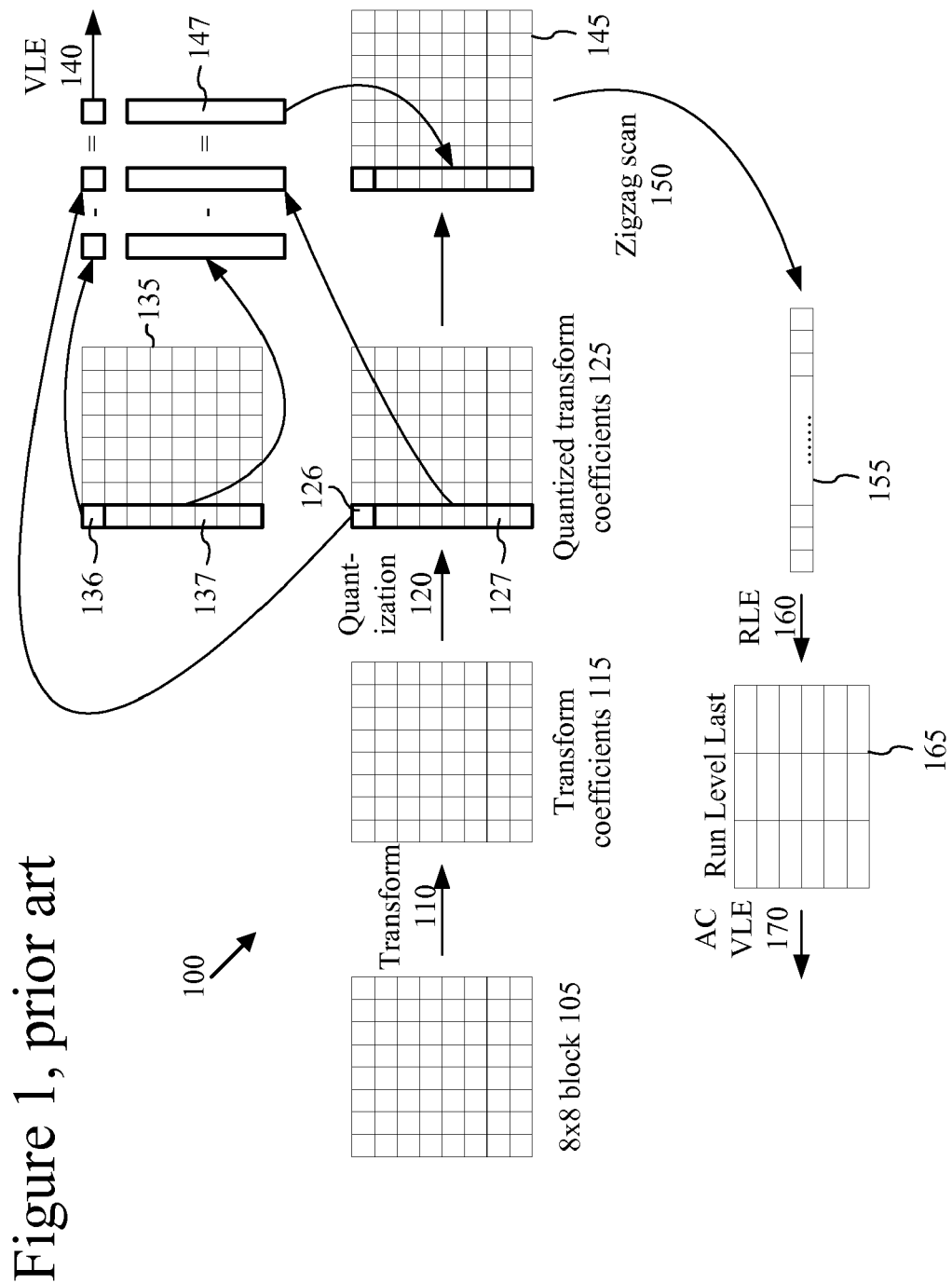
Figure 1, prior art

Figure 2, prior art
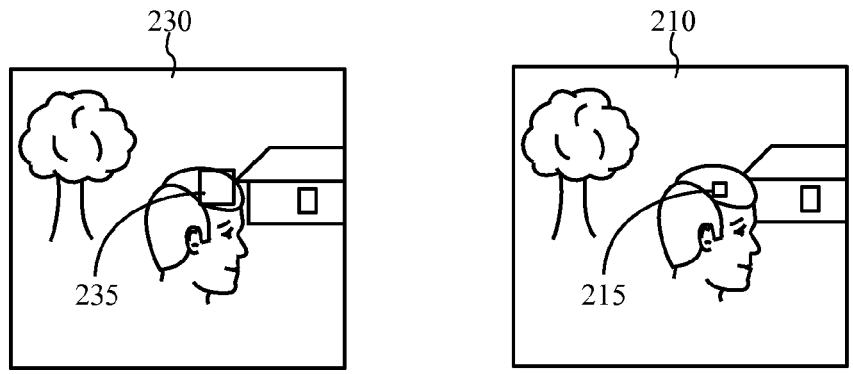
Figure 4
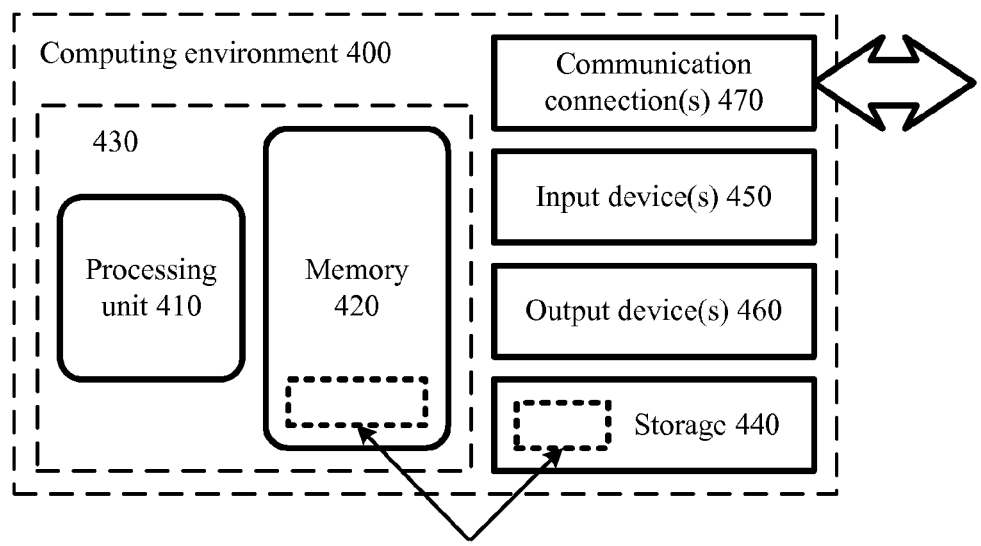
Software 480 implementing encoder or other tool that estimates sample-domain distortion in the transform domain with rounding compensation

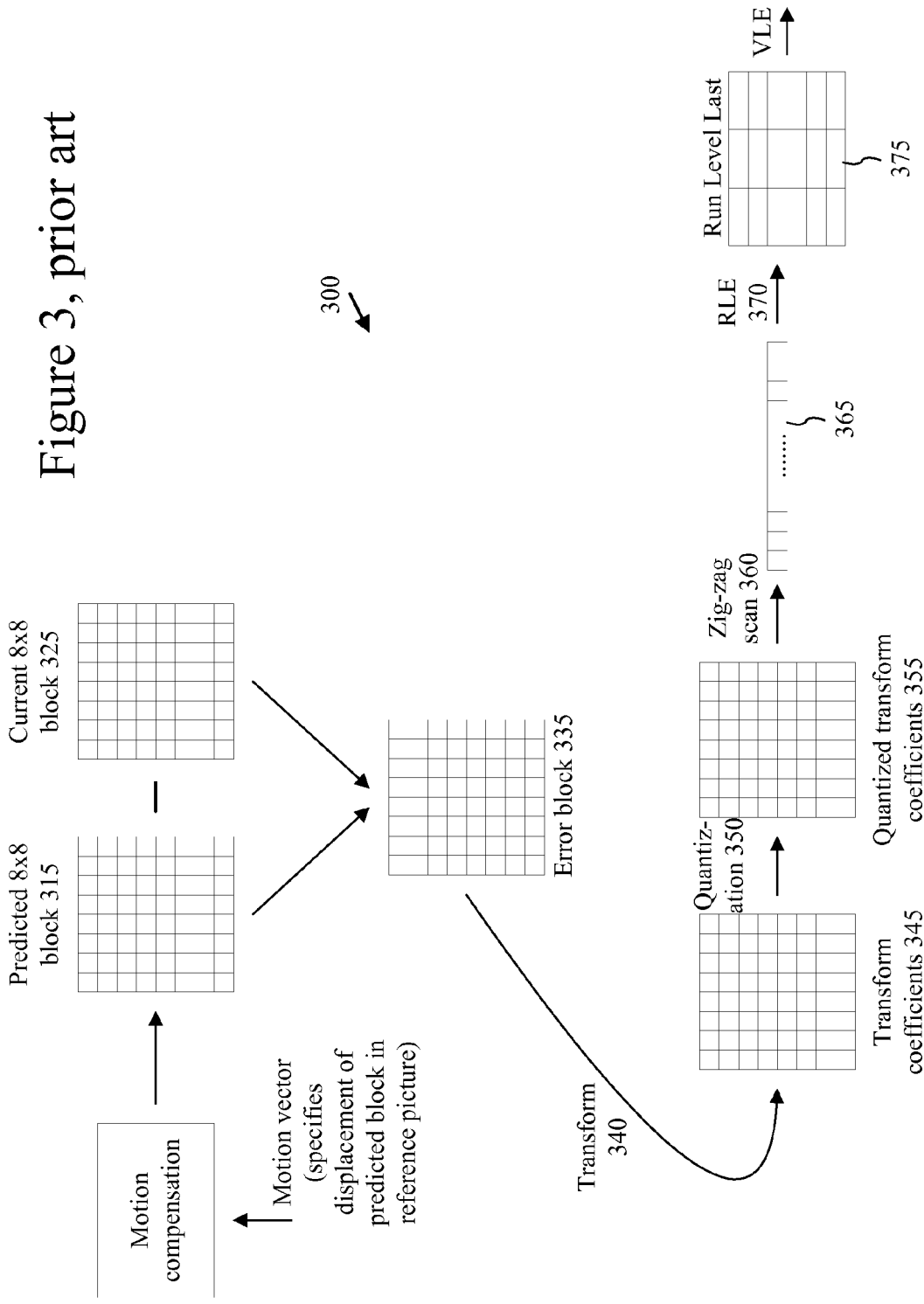
Figure 3, prior art

ESTIMATING SAMPLE-DOMAIN DISTORTION IN THE TRANSFORM DOMAIN WITH ROUNDING COMPENSATION

This is a Continuation of U.S. patent application Ser. No. 11/400,719, filed Apr. 7, 2006, which application is hereby incorporated by reference.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bitrate changes also affect decisions made in codec design as well as decisions made during actual encoding.

In general, video compression techniques include "intra-picture" compression and "inter-picture" compression. Intra-picture compression techniques compress individual pictures, and inter-picture compression techniques compress pictures with reference to a preceding and/or following picture (often called a reference or anchor picture) or pictures.

I. Intra Compression

FIG. 1 illustrates block-based intra compression in an example encoder. In particular, FIG. 1 illustrates intra compression of an 8×8 block (105) of samples by the encoder. The encoder splits a picture into 8×8 blocks of samples and applies a forward 8×8 frequency transform (110) (such as a discrete cosine transform ("DCT")) to individual blocks such as the block (105). The encoder quantizes (120) the transform coefficients (115), resulting in an 8×8 block of quantized transform coefficients (125).

With quantization, the encoder essentially trades off quality and bit rate. More specifically, quantization can affect the fidelity with which the transform coefficients are encoded, which in turn can affect bit rate. Coarser quantization tends to decrease fidelity to the original transform coefficients as the coefficients are more coarsely approximated. Bit rate also decreases, however, when decreased complexity can be exploited with lossless compression. Conversely, finer quantization tends to preserve fidelity and quality but result in higher bit rates.

Different encoders use different parameters for quantization. In most encoders, a level or step size of quantization is set for a block, picture, or other unit of video. In some encoders, the encoder can also adjust the "dead zone," which is the range of values around zero that are approximated as zero. Some encoders quantize coefficients differently within a given block, so as to apply relatively coarser quantization to perceptually less important coefficients, and a quantization matrix can be used to indicate the relative weights. Or, apart from the rules used to reconstruct quantized values, some encoders vary the thresholds according to which values are quantized so as to quantize certain values more aggressively than others.

Returning to FIG. 1, further encoding varies depending on whether a coefficient is a DC coefficient (the lowest frequency coefficient shown as the top left coefficient in the block (125)), an AC coefficient in the top row or left column in the block (125), or another AC coefficient. The encoder typically encodes the DC coefficient (126) as a differential from the reconstructed DC coefficient (136) of a neighboring 8×8 block. The encoder entropy encodes (140) the differential. The entropy encoder can encode the left column or top row of AC coefficients as differentials from AC coefficients a corresponding left column or top row of a neighboring 8×8 block. The encoder scans (150) the 8×8 block (145) of predicted, quantized AC coefficients into a one-dimensional array (155). The encoder then entropy encodes the scanned coefficients using a variation of run/level coding (160).

In corresponding decoding, a decoder produces a reconstructed version of the original 8×8 block. The decoder entropy decodes the quantized transform coefficients, scanning the quantized coefficients into a two-dimensional block, and performing AC prediction and/or DC prediction as needed. The decoder inverse quantizes the quantized transform coefficients of the block and applies an inverse frequency transform (such as an inverse DCT ("IDCT")) to the de-quantized transform coefficients, producing the reconstructed version of the original 8×8 block. When a picture is used as a reference picture in subsequent motion compensation (see below), an encoder also reconstructs the picture.

II. Inter Compression

Inter-picture compression techniques often use motion estimation and motion compensation to reduce bit rate by exploiting temporal redundancy in a video sequence. Motion estimation is a process for estimating motion between pictures. In one common technique, an encoder using motion estimation attempts to match a block of samples in a current picture with a block of samples in a search area in another picture, called the reference picture. When the encoder finds an exact or "close enough" match in the search area in the reference picture, the encoder parameterizes the change in position of the blocks as motion data (such as a motion vector). In general, motion compensation is a process of reconstructing pictures from reference picture(s) using motion data.

FIG. 2 illustrates motion estimation for part of a predicted picture in an example encoder. For an 8×8 block of samples, 16×16 block (often called a "macroblock"), or other unit of the current picture, the encoder finds a similar unit in a reference picture for use as a predictor. In FIG. 2, the encoder computes a motion vector for a 16×16 macroblock (215) in the current, predicted picture (210). The encoder searches in a search area (235) of a reference picture (230). Within the search area (235), the encoder compares the macroblock (215) from the predicted picture (210) to various candidate macroblocks in order to find a candidate macroblock that is a good match. The encoder outputs information specifying the motion vector to the predictor macroblock.

The encoder computes the sample-by-sample difference between the current unit and the predictor to determine a residual (also called error signal). The residual is frequency transformed, quantized, and entropy encoded. The overall bit rate of a predicted picture depends in large part on the bit rate of residuals. The bit rate of residuals is low if the residuals are simple (i.e., due to motion estimation that finds exact or good matches) or lossy compression drastically reduces the complexity of the residuals. Bits saved with successful motion estimation can be used to improve quality elsewhere or reduce overall bit rate. On the other hand, the bit rate of complex residuals can be higher, depending on the degree of lossy compression applied to reduce the complexity of the residuals.

Encoders typically spend a large proportion of encoding time performing motion estimation, attempting to find good matches and thereby improve rate-distortion performance. In most scenarios, however, an encoder lacks the time or resources to check every possible motion vector for every block or macroblock to be encoded. The encoder therefore uses motion vector search patterns and matching heuristics deemed likely to find a good match in an acceptable amount of time.

The number of motion vectors used to represent a picture can also affect rate-distortion performance. Using four motion vectors for four different 8×8 blocks of a 16×16 macroblock (instead of one motion vector for the macroblock) allows an encoder to capture different motion for the different blocks, potentially resulting in better matches. On the other hand, motion vector information for four motion vectors (instead of one) is signaled, increasing bit rate of motion data.

FIG. 3 illustrates compression of a prediction residual for a motion-compensated block of a predicted picture in an example encoder. The encoder computes an 8×8 prediction error block (335) as the difference between a predicted block (315) and a current 8×8 block (325).

The encoder applies a frequency transform (340) to the residual (335), producing a block of transform coefficients (345). Some encoders switch between different sizes of transforms, e.g., an 8×8 transform, two 4×8 transforms, two 8×4 transforms, or four 4×4 transforms for an 8×8 prediction residual block. Smaller transform sizes allow for greater isolation of transform coefficients having non-zero values, but generally require more signaling overhead. FIG. 3 shows the encoder using one 8×8 transform.

The encoder quantizes (350) the transform coefficients (345) and scans (360) the quantized coefficients (355) into a one-dimensional array (365) such that coefficients are generally ordered from lowest frequency to highest frequency. The encoder entropy codes the data in the array (365).

If a predicted picture is used as a reference picture for subsequent motion compensation, the encoder reconstructs the predicted picture. When reconstructing residuals, the encoder reconstructs transform coefficients that were quantized and performs an inverse frequency transform. The encoder performs motion compensation to compute the motion-compensated predictors, and combines the predictors with the residuals. During decoding, a decoder typically entropy decodes information and performs analogous operations to reconstruct residuals, perform motion compensation, and combine the predictors with the reconstructed residuals.

III. Computing Pixel-Domain Distortion when Making Encoding Decisions

The previous two sections mention some of the decisions that an encoder can make during encoding. When encoding a block of a predicted picture, an encoder can evaluate and set a number of coding parameters, including: (1) whether the block should be encoded as an intra or inter; (2) the number of motion vectors; (3) the value(s) of motion vector(s); (4) the type of frequency transform; (5) the size of frequency transform (e.g., 8×8, 4×8, 8×4, or 4×4); (6) the quantization step size; (7) the quantization thresholds to apply; (8) the dead zone size; and (9) the quantization matrix. Or, for a block of an intra-coded picture, the encoder can evaluate and set various quantization-related parameters. Depending on implementation, an encoder may finalize certain parameter decisions before starting to evaluate other parameters. Or, the encoder may jointly explore different combinations of coding parameters, which makes the decision-making process even more complex given the number of permutations to evaluate.

In making encoding decisions, an encoder often evaluates the distortion and rate associated with the different choices. In particular, for a block to be encoded, pixel-domain distortion of the block encoded according to different coding choices is an important criterion in encoder mode decisions. There are several approaches to determining pixel-domain distortion.

In one approach, an encoder performs inverse quantization to reconstruct transform coefficients for a block and performs an inverse frequency transform on the de-quantized transform coefficients. The encoder directly measures pixel-domain distortion by comparing the reconstructed pixel-domain values for the block to the original pixel-domain values for the block. While this approach yields accurate pixel-domain distortion measurements, it is expensive in terms of encoding time and resources. Performing an inverse frequency transform for every evaluated coding choice greatly increases the computational complexity of the encoding task. As a result, encoding time increases or more encoding resources are required. Or, to handle practical time or resource constraints, an encoder evaluates fewer coding options, which can result in the encoder missing efficient options.

In another approach, an encoder performs inverse quantization to reconstruct transform coefficients for a block but measures distortion in the transform domain. The encoder measures transform-domain distortion by comparing the de-quantized transform coefficients for the block to the original transform coefficients for the block. To estimate pixel-domain distortion for the block, the encoder can multiply the transform-domain distortion by a scale factor that depends on the frequency transform used. If the transform is orthogonal, the encoder multiplies the transform-domain distortion by a non-zero scale factor so that the energy in the transform domain is roughly equivalent to the energy in the pixel domain. In this approach, the encoder does not perform an inverse frequency transform for every evaluated coding choice, so computational complexity is lowered. The pixel-domain distortion estimated by this approach is often inaccurate, however, particularly when only the DC coefficient of a block has a significant value. This inaccuracy in pixel-domain distortion estimation can lead to inefficient choices of coding parameters and poor rate-distortion performance.

Given the critical importance of video compression to digital video, it is not surprising that video compression is a richly developed field. Whatever the benefits of previous video compression techniques, however, they do not have the advantages of the following techniques and tools.

SUMMARY

The present application is directed to techniques and tools for compensating for rounding when estimating sample-domain distortion in the transform domain. For example, a video encoder estimates pixel-domain distortion in the transform domain for a block of transform coefficients after compensating for rounding effects in the DC coefficient of the block. In this way, the video encoder improves the accuracy of the pixel-domain distortion estimation but retains the computational advantages of performing the estimation in the transform domain.

According to a first aspect of the described techniques and tools, a tool such as a video encoder compensates for rounding in a coefficient of a set of transform coefficients. The tool estimates sample-domain distortion using the rounding-compensated coefficient and other transform coefficients of the set. The tool then makes a decision based on the estimated distortion and outputs results.

For example, a video encoder compensates for rounding by looking up a table index (determined from a DC coefficient of a block of de-quantized transform coefficients) in a rounding offset table to determine a rounding offset, then adjusting the DC coefficient by the rounding offset. When estimating distortion, the encoder computes the difference between the original DC coefficient and the rounding-compensated DC coefficient. The encoder eventually selects between intra and inter encoding for the block based upon distortion estimates.

According to a second aspect of the described techniques and tools, an encoder includes a frequency transformer, a quantizer, an entropy encoder, an inverse quantizer and a controller. The controller makes encoding decisions after considering post-inverse frequency transform rounding effects on de-quantized transform coefficient values.

According to a third aspect of the described techniques and tools, a range of values for a de-quantized transform coefficient is identified. A rounding offset is computed for each of multiple values in the range. A periodic pattern in the offsets is identified, and representative values are mapped to corresponding rounding offsets in an offset table. The corresponding rounding offsets show at least one period of the pattern without the table including all values in the range. In this way, table size is reduced. The table is stored in computer storage or elsewhere. For example, the offset table is created off-line and distributed with a video encoder for use during video encoding.

This summary introduces a selection of concepts in a simplified form. The concepts are further described below in the detailed description. This summary is not intended to identify key features or essential features of the claimed subject matter, nor is it intended to be used to limit the scope of the claimed subject matter.

The foregoing and other objects, features, and advantages will become more apparent from the following detailed description, which proceeds with reference to the accompanying figures.

BRIEF DESCRIPTION OF THE DRAWINGS

FIG. 1 is a diagram showing encoding of a block with intra-picture compression according to the prior art.

FIG. 2 is a diagram showing motion estimation according to the prior art.

FIG. 3 is a diagram showing encoding of a block with inter-picture compression according to the prior art.

FIG. 4 is a block diagram of a suitable computing environment in which several described embodiments may be implemented.

DETAILED DESCRIPTION

Figure 5:
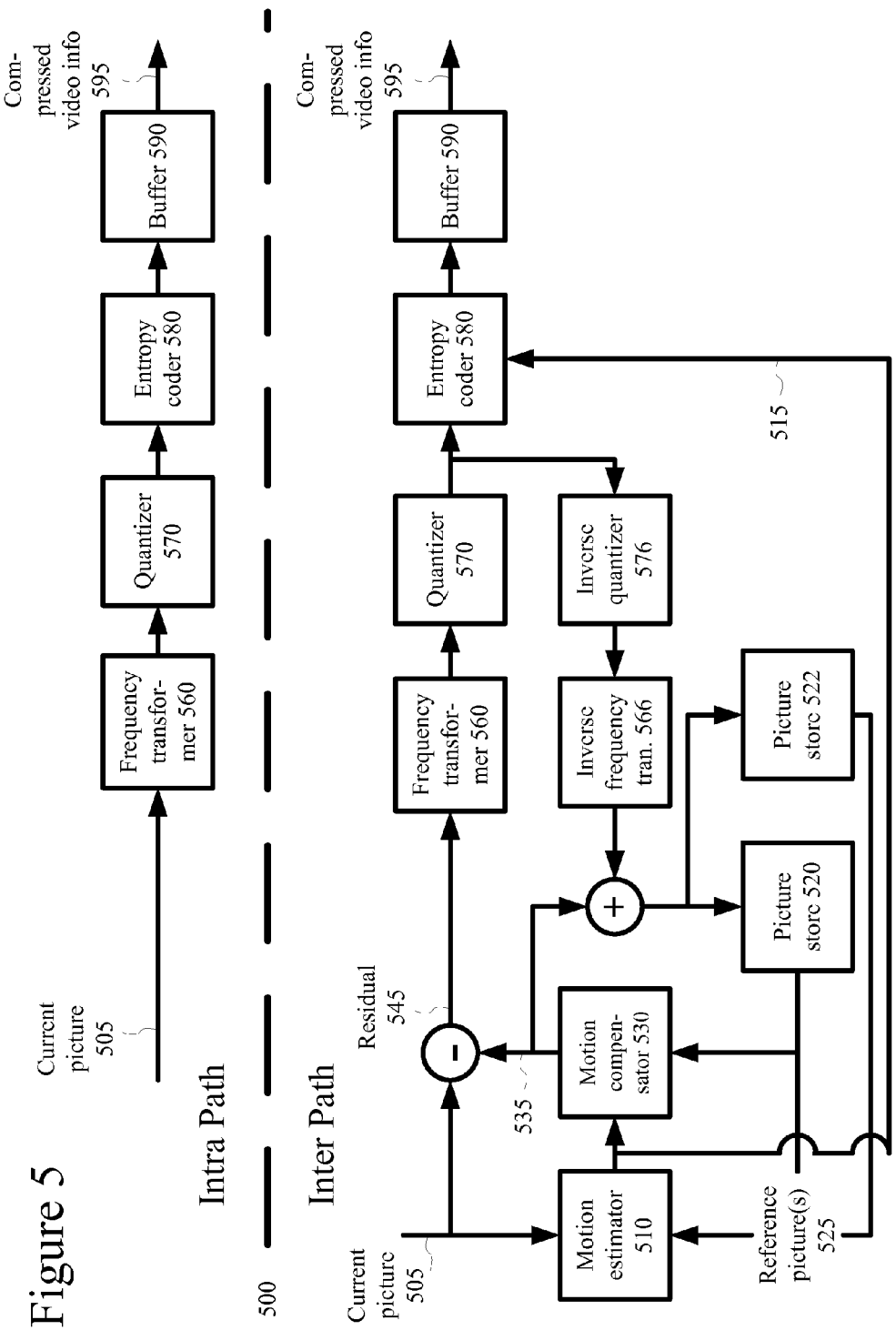
FIG. 5 is a block diagram of a video encoder system in conjunction with which several described embodiments may be implemented.

The present application relates to techniques and tools for estimating sample-domain distortion in the transform domain with rounding compensation. In various described embodiments, a video encoder incorporates techniques for estimating pixel-domain distortion in the transform domain with rounding compensation.

Various alternatives to the implementations described herein are possible. For example, certain techniques described with reference to flowchart diagrams can be altered by changing the ordering of stages shown in the flowcharts, by repeating or omitting certain stages, etc. The various techniques and tools described herein can be used in combination or independently. Different embodiments implement one or more of the described techniques and tools. Aside from uses in video encoding, sample-domain distortion estimation in the transform domain with rounding compensation can be used in image encoding, video transcoding, image classification, or other areas.

Some of the techniques and tools described herein address one or more of the problems noted in the Background. Typically, a given technique/tool does not solve all such problems. Rather, in view of constraints and tradeoffs in encoding time, resources, and/or quality, the given technique/tool improves encoding performance for a particular implementation or scenario.

I. Computing Environment

FIG. 4 illustrates a generalized example of a suitable computing environment (400) in which several of the described embodiments may be implemented. The computing environment (400) is not intended to suggest any limitation as to scope of use or functionality, as the techniques and tools may be implemented in diverse general-purpose or special-purpose computing environments.

With reference to FIG. 4, the computing environment (400) includes at least one processing unit (410) and memory (420). In FIG. 4, this most basic configuration (430) is included within a dashed line. The processing unit (410) executes computer-executable instructions and may be a real or a virtual processor. In a multi-processing system, multiple processing units execute computer-executable instructions to increase processing power. The memory (420) may be volatile memory (e.g., registers, cache, RAM), non-volatile memory (e.g., ROM, EEPROM, flash memory, etc.), or some combination of the two. The memory (420) stores software (480) implementing an encoder with one or more of the described techniques and tools for sample-domain distortion estimation in the transform domain with rounding compensation.

A computing environment may have additional features. For example, the computing environment (400) includes storage (440), one or more input devices (450), one or more output devices (460), and one or more communication connections (470). An interconnection mechanism (not shown) such as a bus, controller, or network interconnects the components of the computing environment (400). Typically, operating system software (not shown) provides an operating environment for other software executing in the computing environment (400), and coordinates activities of the components of the computing environment (400).

The storage (440) may be removable or non-removable, and includes magnetic disks, magnetic tapes or cassettes, CD-ROMs, DVDs, or any other medium which can be used to store information and which can be accessed within the computing environment (400). The storage (440) stores instructions for the software (480) implementing the video encoder.

The input device(s) (450) may be a touch input device such as a keyboard, mouse, pen, or trackball, a voice input device, a scanning device, or another device that provides input to the computing environment (400). For audio or video encoding, the input device(s) (450) may be a sound card, video card, TV tuner card, or similar device that accepts audio or video input in analog or digital form, or a CD-ROM or CD-RW that reads audio or video samples into the computing environment (400). The output device(s) (460) may be a display, printer, speaker, CD-writer, or another device that provides output from the computing environment (400).

The communication connection(s) (470) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (400), computer-readable media include memory (420), storage (440), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "decide" and "analyze" to describe computer operations in a computing environment. These terms are high-level abstractions for operations performed by a computer, and should not be confused with acts performed by a human being. The actual computer operations corresponding to these terms vary depending on implementation.

II. Generalized Video Encoder

FIG. 5 is a block diagram of a generalized video encoder (500) in conjunction with which some described embodiments may be implemented. The encoder (500) receives a sequence of video pictures including a current picture (505) and produces compressed video information (595) as output to storage, a buffer, or a communications connection. The format of the output bitstream can be a Windows Media Video or VC-1 format, MPEG-x format (e.g., MPEG-1, MPEG-2, or MPEG-4), H.26x format (e.g., H.261, H.262, H.263, or H.264), or other format.

The encoder (500) processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder (500) is block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. The encoder (500) can perform operations on sets of samples of different size or configuration than 8×8 blocks and 16×16 macroblocks. Alternatively, the encoder (500) is object-based or uses a different macroblock or block format.

Returning to FIG. 5, the encoder system (500) compresses predicted pictures and intra-coded, key pictures. For the sake of presentation, FIG. 5 shows a path for key pictures through the encoder system (500) and a path for predicted pictures. Many of the components of the encoder system (500) are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction from one or more other pictures (which are typically referred to as reference pictures or anchors). A prediction residual is the difference between predicted information and corresponding original information. In contrast, a key picture (e.g., progressive I-frame, interlaced I-field, or interlaced I-frame) is compressed without reference to other pictures.

If the current picture (505) is a predicted picture, a motion estimator (510) estimates motion of macroblocks or other sets of samples of the current picture (505) with respect to one or more reference pictures. The picture store (520) buffers a reconstructed previous picture (525) for use as a reference picture. When multiple reference pictures are used, the multiple reference pictures can be from different temporal directions or the same temporal direction. The encoder system (500) can use the separate stores (520) and (522) for multiple reference pictures.

The motion estimator (510) can estimate motion by full-sample, ½-sample, ¼-sample, or other increments, and can switch the precision of the motion estimation on a picture-by-picture basis or other basis. The motion estimator (510) (and compensator (530)) also can switch between types of reference picture sample interpolation (e.g., between bicubic and bilinear) on a per-picture or other basis. The precision of the motion estimation can be the same or different horizontally and vertically. The motion estimator (510) outputs as side information motion information (515) such as differential motion vector information. The encoder (500) encodes the motion information (515) by, for example, computing one or more motion vector predictors for motion vectors, computing differentials between the motion vectors and motion vector predictors, and entropy coding the differentials. To reconstruct a motion vector, a motion compensator (530) combines a motion vector predictor with differential motion vector information.

The motion compensator (530) applies the reconstructed motion vectors to the reconstructed (reference) picture(s) (525) when forming a motion-compensated current picture (535). The difference (if any) between a block of the motion-compensated current picture (535) and corresponding block of the original current picture (505) is the prediction residual (545) for the block. During later reconstruction of the current picture, reconstructed prediction residuals are added to the motion compensated current picture (535) to obtain a reconstructed picture that is closer to the original current picture (505). In lossy compression, however, some information is still lost from the original current picture (505). Alternatively, a motion estimator and motion compensator apply another type of motion estimation/compensation.

A frequency transformer (560) converts spatial domain video information into frequency domain (i.e., spectral, transform) data. For block-based video pictures, the frequency transformer (560) applies a DCT, variant of DCT, or other forward block transform to blocks of the samples or prediction residual data, producing blocks of frequency transform coefficients. Alternatively, the frequency transformer (560) applies another conventional frequency transform such as a Fourier transform or uses wavelet or sub-band analysis. The frequency transformer (560) may apply an 8×8, 8×4, 4×8, 4×4 or other size frequency transform.

A quantizer (570) then quantizes the blocks of transform coefficients. The quantizer (570) applies uniform, scalar quantization to the spectral data with a step-size that varies on a picture-by-picture basis or other basis. The quantizer (570) can also apply another type of quantization to the spectral data coefficients, for example, a non-uniform, vector, or non-adaptive quantization. In addition to adaptive quantization, the encoder (500) can use frame dropping, adaptive filtering, or other techniques for rate control.

When a reconstructed current picture is needed for subsequent motion estimation/compensation, an inverse quantizer (576) performs inverse quantization on the quantized spectral data coefficients. An inverse frequency transformer (566) performs an inverse frequency transform, producing blocks of reconstructed prediction residuals (for a predicted picture) or samples (for a key picture). If the current picture (505) was a key picture, the reconstructed key picture is taken as the reconstructed current picture (not shown). If the current picture (505) was a predicted picture, the reconstructed prediction residuals are added to the motion-compensated predictors (535) to form the reconstructed current picture. One or both of the picture stores (520, 522) buffers the reconstructed current picture for use in subsequent motion-compensated prediction. In some embodiments, the encoder applies a de-blocking filter to the reconstructed frame to adaptively smooth discontinuities and other artifacts in the picture.

The entropy coder (580) compresses the output of the quantizer (570) as well as certain side information (e.g., motion information (515), quantization step size). Typical entropy coding techniques include arithmetic coding, differential coding, Huffman coding, run length coding, LZ coding, dictionary coding, and combinations of the above. The entropy coder (580) typically uses different coding techniques for different kinds of information, and can choose from among multiple code tables within a particular coding technique.

The entropy coder (580) provides compressed video information (595) to the multiplexer ("MUX") (590). The MUX (590) may include a buffer, and a buffer level indicator may be fed back to a controller. Before or after the MUX (590), the compressed video information (595) can be channel coded for transmission over the network. The channel coding can apply error detection and correction data to the compressed video information (595).

A controller (not shown) receives inputs from various modules such as the motion estimator (510), frequency transformer (560), quantizer (570), inverse quantizer (576), entropy coder (580), and buffer (590). The controller evaluates intermediate results during encoding, for example, estimating distortion and performing other rate-distortion analysis. The controller works with modules such as the motion estimator (510), frequency transformer (560), quantizer (570), and entropy coder (580) to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters, for example, jointly making an intra/inter block decision and selecting motion vector values, if any, for a block. The tree of coding parameter decisions to be evaluated, and the timing of corresponding encoding, depends on implementation.

The relationships shown between modules within the encoder (500) indicate general flows of information in the encoder; other relationships are not shown for the sake of simplicity. In particular, FIG. 5 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders typically use a variation or supplemented version of the generalized encoder (500). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Estimating Sample-Domain Distortion with Rounding Compensation

Techniques and tools described herein provide ways to estimate sample-domain distortion accurately in the transform domain. In particular, an encoder or other tool estimates sample-domain distortion using transform coefficients, after compensating for at least some of the rounding that would occur following an inverse frequency transform.

A. Theory and Explanation.

When selecting certain coding parameters, an encoder evaluates the distortion and/or rate associated with different coding parameter choices in order to improve rate-distortion performance. In particular, pixel-domain distortion is an important factor in encoding decisions in many systems. The pixel-domain distortion for a block is based on differences between original sample values for the block and reconstructed sample values for the block. As such, the pixel-domain distortion reflects fidelity changes from throughout encoding (e.g., from quantization) and reconstruction (e.g., from rounding after an inverse frequency transform).

One problem with computing distortion in the sample domain is that fully reconstructing sample values requires an inverse frequency transform. This adds a small computational cost every time a coding parameter or combination is evaluated with pixel-domain distortion measurement. Even if the cost of performing a single inverse frequency transform is small, in the aggregate, the computational cost becomes significant.

One way to avoid the cost of performing an inverse frequency transform per distortion measurement is to estimate pixel-domain distortion in the transform domain, with reference to transform coefficients. By speeding up estimation, a particular set of coding parameters can be evaluated more quickly, or more coding parameters can be evaluated within a particular duration of time. Such transform-domain estimations are inaccurate in many cases, however, in that they do not correlate well with corresponding pixel-domain distortion measurements, even when scaling factors compensate for differences in pixel-domain energy and transform-domain energy.

For example, suppose an encoder frequency transforms an 8×8 block of uniform sample values (all "1") into the following 8×8 block of transform coefficients.

$$\begin{bmatrix} 7 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad (a)$$

Following quantization and inverse quantization, suppose the 8×8 block of transform coefficients has the following de-quantized values.

$$\begin{bmatrix} 5 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad (b)$$

If the encoder estimates pixel-domain distortion using the transform coefficients of blocks (a) and (b), the difference in DC coefficient values indicates distortion has been introduced. This might not correlate with pixel-domain distortion, however. Suppose that when the encoder applies an inverse frequency transform to block (b), due to rounding effects after the inverse frequency transform, an 8×8 block of uniform sample values (all "1") is reconstructed. In that case, effectively no pixel-domain distortion has been introduced, contrary to the estimate of pixel-domain distortion made using only the transform coefficients.

Depending on the distortion metric used, block (b) might be even considered less favorable than another block such as:

$$\begin{bmatrix} 7 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad (c)$$

If the encoder applies an inverse frequency transform to block (c), however, the 8×8 block may have non-uniform sample values due to the effect of the non-zero AC coefficient. This shows another mismatch between estimated and actual pixel-domain distortion values.

In many implementations, after an encoder performs an integer forward frequency transform, the results of the transform are not normalized completely. In other words, the intermediate representation of information has a higher resolution than the original representation. This allows the encoder to retain precision in intermediate results. Although rounding may occur in the intermediate results after the forward integer transform, the rounding often is insignificant in absolute terms and relative to subsequent quantization. After the encoder or a decoder performs the integer inverse frequency transform, however, rounding effects are typically much more significant. After the inverse transform, results are returned to the resolution of the original representation, which can include normalization to account for retained precision/expansion from the forward transform as well as expansion from the inverse transform.

More formally, suppose $\hat{X}$ represents de-quantized transform coefficients for a block, and $\hat{x}$ represents the inverse frequency transformed de-quantized transform coefficients, $T^{-1}(\hat{X})$. The de-quantized transform coefficients are not necessarily the same as the transform of $\hat{x}$. For example, $\hat{X}_{Block(b)}$ does not equal $T(T^{-1}(\hat{X}_{Block(b)}))$. Due to rounding effects, distortion calculated in the transform domain using de-quantized transform coefficient values $\hat{X}$ and original transform coefficient values $X$ is biased and may lead the encoder to make a wrong decision.

For many inverse transforms, the DC coefficient has consistent and pronounced rounding effects. In contrast, rounding effects due to AC coefficients are less predictable and less pronounced. A typical frequency transform matrix has a top row of matrix coefficients with all positive values. Subsequent rows have positive and negative values. For many patterns of information, positive and negative effects cancel each other out for an AC coefficient, but the positive values of the top row consistently affect rounding due the DC coefficient. In addition, the DC coefficient affects all samples in a block in the same way, whereas an AC coefficient affects different samples differently. AC coefficients also tend to have smaller magnitudes than DC coefficients. Finally, to the extent AC coefficients do have rounding effects, the rounding effects for different AC coefficients often cancel each other out.

Therefore, in some embodiments, one or more rounding offsets parameterize the difference(s) between $T(\hat{x})$ and $\hat{X}$, thereby accounting for rounding effects that follow an inverse frequency transform. In some implementations, rounding compensation accounts for rounding effects from DC coefficients but not AC coefficients. For a block of de-quantized transform coefficients $\hat{X}$, an encoder compensates for rounding effects in the DC coefficient $\hat{X}(0,0)$ of the block before estimating sample-domain distortion in the transform domain. The encoder does not adjust the de-quantized AC coefficients of the block, as the overall effect of AC rounding on distortion calculation is typically negligible. Alternatively, rounding compensation accounts for rounding effects in at least some AC coefficients. For example, rounding compensation accounts for rounding effects for the top row or left column of AC coefficients for a block of transform coefficients.

The encoder determines a rounding offset for a particular DC coefficient $\hat{X}(0,0)$ by looking up an index for the DC coefficient in a table that maps indices to rounding offsets. The table is implemented as an array or other data structure. In a simple case, the index is the DC coefficient itself, and the table includes a rounding offset for each possible de-quantized DC coefficient value. The rounding offset is then added to the DC coefficient to produce a rounding-compensated DC coefficient.

$$\hat{X}^{rc}(0,0)=\hat{X}(0,0)+\text{DCOFFSET}[\hat{X}(0,0)],$$

where $\hat{X}^{rc}(0,0)$ is the rounding-compensated DC coefficient, and DCOFFSET[ ] is an table mapping indices to corresponding rounding offsets. Or, the DC coefficient is first mapped to an integer ranging from 0 to $N_{rounding}-1$, which is used as an index to a table that maps indices to rounding offsets.

$$\hat{X}^{rc}(0,0)=\hat{X}(0,0)+\text{DCOFFSET}[f(\hat{X}(0,0))],$$

where $f(\cdot)$ is an index-mapping function that maps a de-quantized DC coefficient to an index in the range [0, $N_{rounding}-1$], and DCOFFSET[ ] has length $N_{rounding}$.

In the sample domain, distortion is computed using original sample values and reconstructed sample values. Suppose x denotes a block of sample values, and $\hat{x}$ denotes a block of reconstructed sample values obtained through inverse transform of $\hat{X}$: $\hat{x}=T^{-1}(\hat{X})$. Distortion measured in the sample domain is based on x and $\hat{x}$. The distortion metric D can be defined in different ways. For example, D can be a sum of squared differences or errors ("SSE"):

$$D = \sum_{for\ all\ i,j} (x_{i,j} - \hat{x}_{i,j})^2,$$

where $x_i$ and $\hat{x}_i$ are elements of x and $\hat{x}$, respectively, for all elements i and j. Or, D can be a sum of absolute differences ("SAD") or mean squared error ("MSE") metric.

The cost of performing an inverse transform $T^{-1}(\cdot)$ on a large number of possible coding parameters or permutations for each block can be very expensive in the aggregate. Given the rounding-compensated de-quantized coefficient matrix $\hat{X}^{rc}$ and original transform coefficients X, however, sample-domain distortion can be estimated without performing the inverse transform $T^{-1}(\cdot)$. Adapting the SSE metric, one rounding-compensated sample-domain distortion metric is:

$$D^{rc} = \sum_{for\ all\ i,j} (\hat{X}^{rc}_{i,j} - X_{i,j})^2.$$

Alternatively, an adapted SAD metric is used:

$$D^{rc} = \sum_{for\ all\ i,j} |\hat{X}^{rc}_{i,j} - X_{i,j}|.$$

Or, an adapted MSE metric is used:

$$D^{rc} = \frac{\sum_{for\ all\ i,j} |\hat{X}^{rc}_{i,j} - X_{i,j}|^2}{I \times J}.$$

In some implementations, the distortion metric is scaled by a transform-specific scaling factor $\alpha$, for example, as follows:

$$D^{rc} = \alpha \sum_{for\ all\ i,j} (\hat{X}^{rc}_{i,j} - X_{i,j})^2$$

The scaling factor accounts for differences between pixel-domain energy and transform-domain energy when the applied transform is non-unitary. When an encoder applies a frequency transform, the transform matrix values may cause a difference in energy in the transform domain and pixel domain. This is particularly true for integer transforms that are not completely normalized. In general, the scaling factor $\alpha$ for a transform depends on the norms of the transform. For example, consider the following transforms:

$$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & 16 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix}.$$

$$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}$$

A VC-1 encoder can perform forward 4×4, 4×8, 8×4, and 8×8 transforms on a residual data block $D_{i \times j}$ (having i rows and j columns) as follows:

$$\hat{D}_{4 \times 4} = (T_4 \cdot D_{4 \times 4} \cdot T'_4) \circ N_{4 \times 4} \text{ for a 4×4 transform,}$$

$$\hat{D}_{8 \times 4} = (T_8 \cdot D_{8 \times 4} \cdot T'_4) \circ N_{8 \times 4} \text{ for a 8×4 transform,}$$

$$\hat{D}_{4 \times 8} = (T_4 \cdot D_{4 \times 8} \cdot T'_8) \circ N_{4 \times 8} \text{ for a 4×8 transform, and}$$

$$\hat{D}_{8 \times 8} = (T_8 \cdot D_{8 \times 8} \cdot T'_8) \circ N_{8 \times 8} \text{ for a 8×8 transform,}$$

where · indicates a matrix multiplication, $\circ N_{i \times j}$ indicates a component-wise multiplication by a normalization factor, T' indicates the inverse of the matrix T, and $\hat{D}_{i \times j}$ represents the transform coefficient block. The values of the normalization matrix $N_{i \times j}$ are given by:

$$N_{i \times j} = c'_i c_j,$$

where:

$$c_4 = \left( \frac{8}{289} \quad \frac{8}{292} \quad \frac{8}{289} \quad \frac{8}{292} \right), \text{ and}$$

$$c_8 = \left( \frac{8}{288} \quad \frac{8}{289} \quad \frac{8}{292} \quad \frac{8}{289} \quad \frac{8}{288} \quad \frac{8}{289} \quad \frac{8}{292} \quad \frac{8}{289} \right).$$

The forward transform causes an average expansion of a little more than $34^2$ in the transform coefficients, and the inverse transform causes an average expansion of a little more than $34^2$ in the other direction. Collectively, the inverse transform includes right shifts by 10 for simple normalization, which corresponds to division by 1024 with truncation. So, the normalization in the inverse transform is essentially by $(1/32)^2$. The forward transform includes normalization by an average of roughly $(1/36)^2$. The average normalization in the forward transform (roughly $(1/36)^2$) more than compensates for the average expansion (roughly $34^2$), so as to simplify normalization in the inverse transform for decoder implementations. As a result, considering expansion and normalization of the forward transform, the average effect is $34^2/36^2 \approx 0.9$. As such, an example scaling factor $\alpha$ between sample-domain distortion and transform domain distortion for an adapted SSE metric is $0.9^2 \approx 0.8$ The scaling factor $\alpha$ for a different transform is similarly determined considering expansion and normalization in the forward transform.

B. Distortion Estimation Tools with Rounding Compensation

Figure 6:
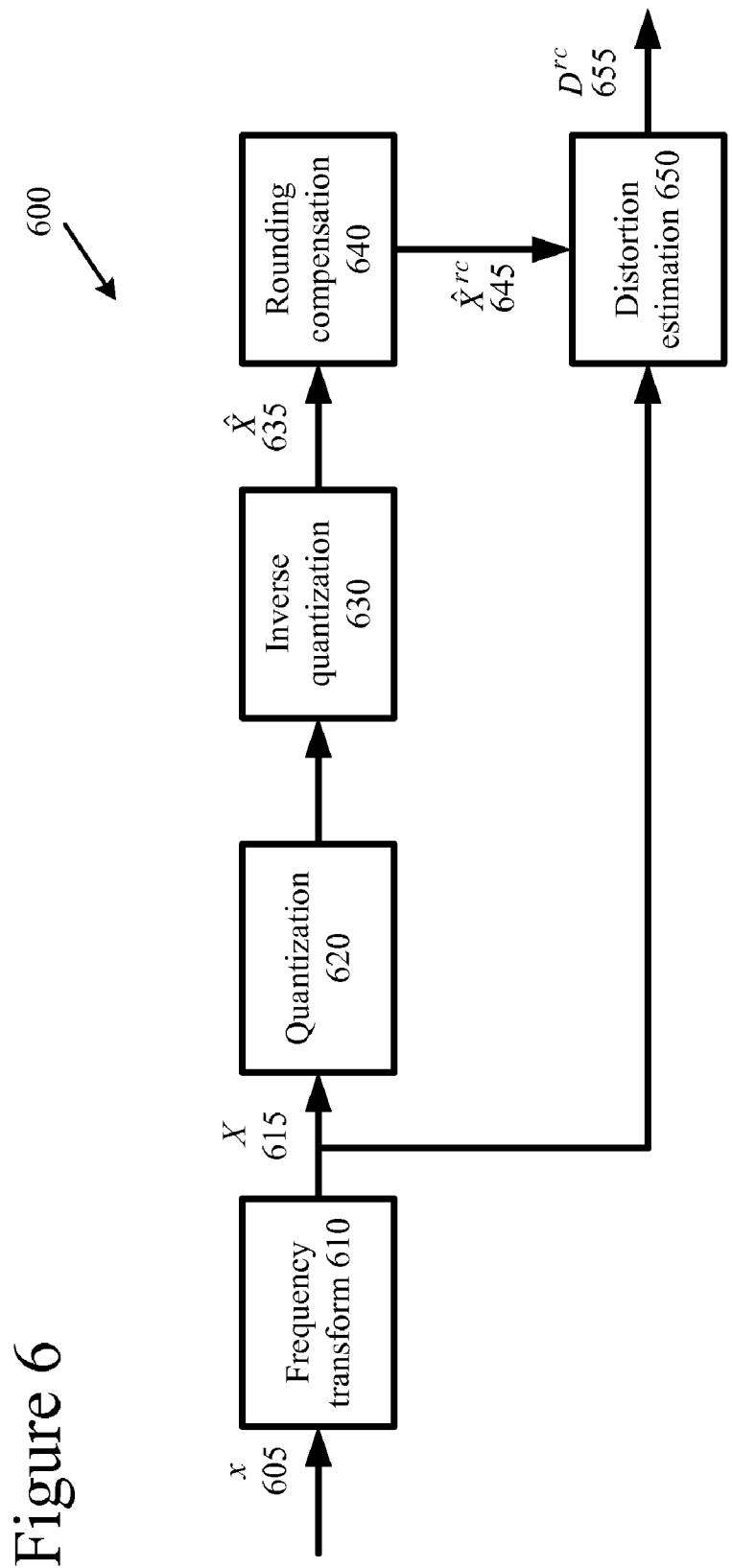
FIG. 6 is a block diagram of a generalized tool for estimating sample-domain distortion in the transform domain using rounding compensation

FIG. 6 shows a generalized tool (600) for estimating sample-domain distortion in the transform domain using rounding compensation. The tool (600) includes a rounding compensation module (640) that improves the accuracy of pixel-based distortion estimated in the transform domain.

An encoder such as the encoder (500) of FIG. 5 incorporates the tool (600) in a controller or other module. Alternatively, another type of encoder or system incorporates the distortion estimation tool (600).

In FIG. 6, x denotes a block or other set of sample values (605) in a sample domain. For example, the sample values (605) are intensity values in the pixel domain for an image or video picture. For a video picture, the sample values of an intra-coded block are original intensity values, and the sample values of an inter-coded block are intensity values for a prediction residual. In encoders that use spatial prediction of sample values for intra-coded blocks, the intensity values of the block x can be for a prediction residual following spatial prediction. In some implementations, the intensity values are for the Y channel (i.e., luminance). In other implementations, the intensity values are for the U and V channels (i.e., chrominance) or for Y, U, and V channels at different times.

The frequency transform module (610) transforms the sample values (605) into a block or other set of transform coefficients (615). The transform module (610) applies a DCT, DCT-like transform, or other block-based transform. The size of the transform is 8×8, 8×4, 4×8, 4×4 or some other size.

The quantization module (620) quantizes the transform coefficients (615). Any of various types of quantization are applied. For example, the quantization module (620) applies uniform or non-uniform quantization, scalar or vector quantization, and/or adaptive or non-adaptive quantization. The quantization module (620) produces a block or other set of quantized coefficients.

The inverse quantization module (630) performs inverse quantization on the quantized transform coefficients. The inverse quantization module (630) produces a block or other set of de-quantized transform coefficients (635).

The rounding compensation module (640) adjusts one or more of the de-quantized transform coefficients (635). For example, the rounding compensation module (640) adds a rounding offset to the DC coefficient of the de-quantized transform coefficients (635). Alternatively, the rounding compensation module (640) adjusts one or more of the de-quantized transform coefficients (635) using some other mechanism. The rounding compensation module (640) produces the de-quantized transform coefficients (645), denoted with $\hat{X}^{rc}$ in FIG. 6, which include the rounding-compensated coefficient(s).

The distortion estimation module (650) computes a distortion estimate using the original transform coefficients (615) and the de-quantized transform coefficients (645) that include the rounding-compensated coefficient(s). The distortion metric is SSE, SAD, MSE, or some other metric, and can be scaled or unscaled.

Particular embodiments of encoders or other tools typically use a variation or supplemented version of the generalized tool (600). Depending on implementation, modules of the tool can be added, omitted, split into multiple modules, combined with other modules, and/or replaced with like modules. In alternative embodiments, tools with different modules and/or other configurations of modules perform one or more of the described techniques.

C. Estimating Distortion with Rounding Compensation

Figure 7:
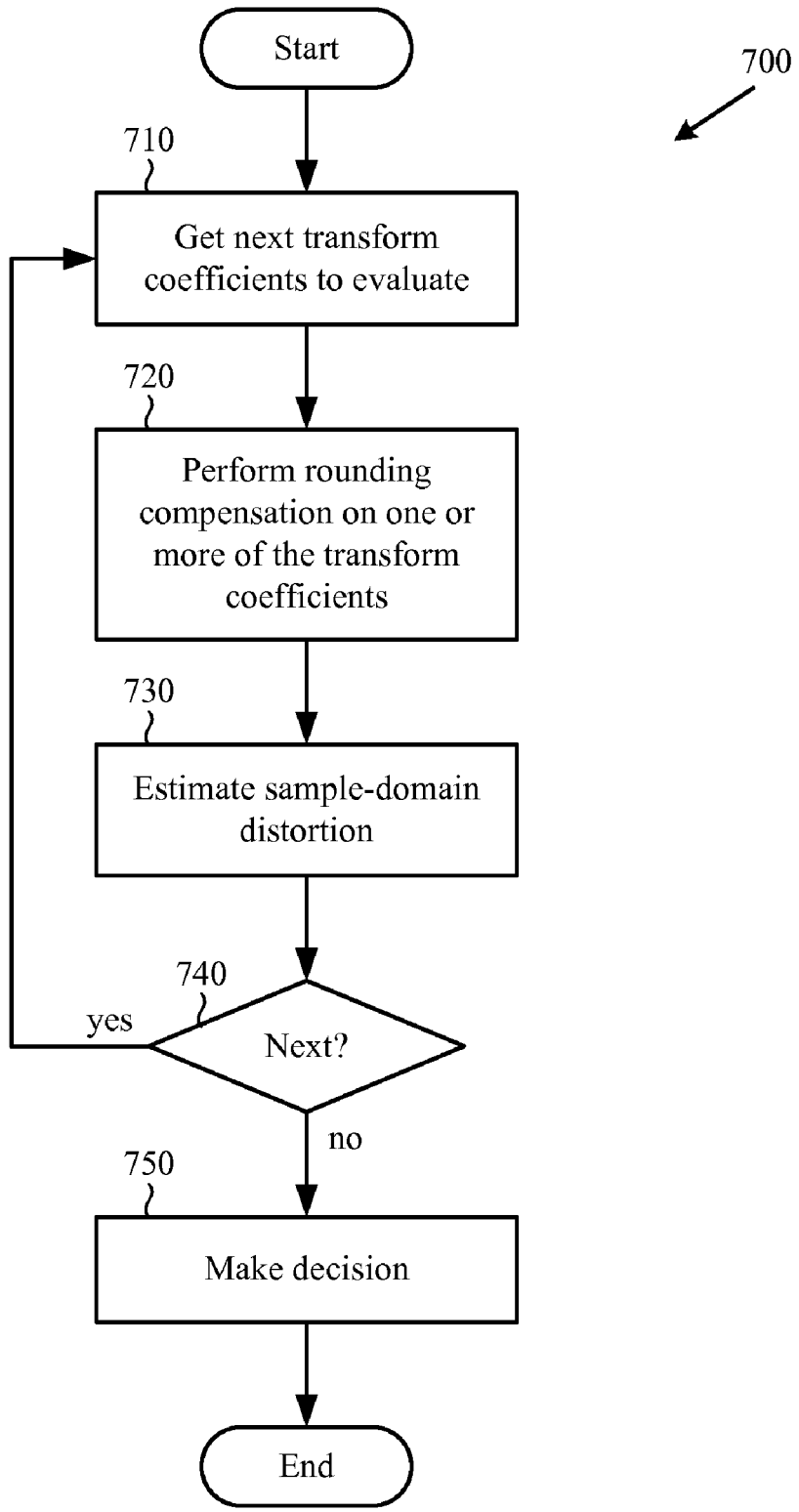
FIG. 7 is a flowchart of a generalized technique for estimating sample-domain distortion from transform coefficients with rounding compensation.
Figure 8:
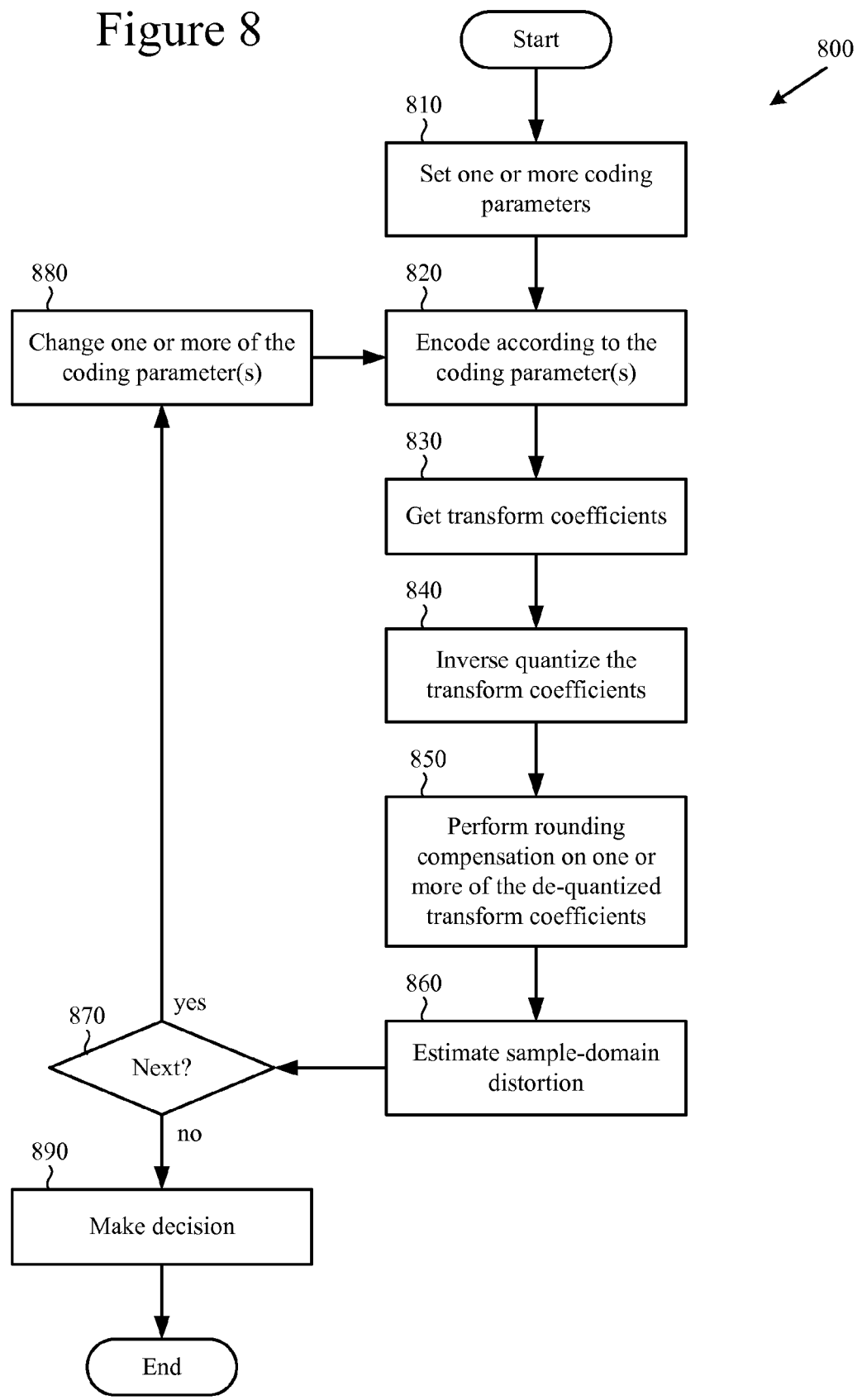
FIG. 8 is a flowchart of a technique for estimating pixel-domain distortion from transform coefficients with rounding compensation during encoding.

FIGS. 7 and 8 show techniques (700, 800) for estimating sample-domain distortion from transform coefficients using rounding compensation. FIG. 7 shows a generalized technique (700), and FIG. 8 shows a technique (800) performed during video encoding.

1. Generalized Technique

With reference to FIG. 7, a tool such as a video encoder, video transcoder, image encoder, or image classification tool gets (710) a block or other set of transform coefficients to evaluate. For example, the tool gets de-quantized transform coefficients following partial decompression of the transform coefficients. Alternatively, the tool gets the transform coefficients in some other way.

The tool then performs (720) rounding compensation on one or more of the transform coefficients. For example, the tool adjusts the DC coefficient by a rounding offset associated with the value of the DC coefficient. In some implementations, the tool uses a rounding offset table that maps DC coefficients (or indices derived from DC coefficients) to rounding offsets. Alternatively, the tool performs rounding compensation for other and/or additional transform coefficients or uses another mechanism for determining rounding offsets.

The tool estimates (730) sample-domain distortion using the rounding-compensated transform coefficients. For example, the distortion metric is scaled or unscaled SAD, MSE, or SSE. The tool determines (740) whether there are any other sets of transform coefficients to be evaluated before making a decision based upon the results of the distortion estimate(s). If so, the tool continues with the next transform coefficients to evaluate. Otherwise, the tool makes (750) a decision based upon the results of the previous distortion estimate(s).

2. Distortion Estimation in Video Encoding

With reference to FIG. 8, a video encoder uses distortion estimation with rounding compensation in making encoding decisions. The encoder uses this low-complexity approach to computing pixel-domain distortion accurately to improve the choice of coding parameters at the encoder without significantly increasing encoder complexity.

The video encoder sets (810) one or more coding parameters for a block to be encoded. Depending on implementation, at different times, the coding parameters can include: (1) whether the block should be encoded as intra or inter; (2) a number of motion vectors; (3) value(s) of motion vector(s); (4) a type of a frequency transform; (5) a size of a frequency transform (e.g., 8×8, 4×8, 8×4, or 4×4); (6) a quantization step size; (7) quantization thresholds; (8) a dead zone size; and/or (9) perceptual quantization factors. The technique (800) can be applied to set parameters for an intra block or macroblock, inter block or macroblock, or other unit of video. Alternatively, the coding parameters relate to other and/or additional coding options.

The encoder encodes (820) the block according to the set coding parameter(s), performing a frequency transform and quantization, and gets (830) the transform coefficients to be analyzed. The encoder inverse quantizes (840) the transform coefficients, producing de-quantized transform coefficients. The encoder then performs rounding compensation (850) on one or more of the de-quantized transform coefficients, for example, adjusting the DC coefficient by a rounding offset associated with the value of the DC coefficient.

The encoder estimates (860) pixel-domain distortion using the rounding-compensated transform coefficient(s). For example, the encoder computes a scaled SSE or other distortion metric that compares original transform coefficients with the rounding-compensated de-quantized transform coefficient(s) (from (850)) and other de-quantized transform coefficients the encoder got.

The encoder determines (870) whether there are any other sets of transform coefficients to be evaluated before making an encoding decision based upon the distortion estimate(s). The encoder stops the evaluation process if constrained by time or resource requirements, if the encoder has evaluated a complete range of options, if the previous transform coefficients provide acceptable results, or according to some other criteria.

If the encoder continues evaluation, the encoder changes (880) one or more of the coding parameter(s) and encodes the block according to the current coding parameter(s). In changing the coding parameter(s), the encoder can consider the results of previous distortion estimates so as to more accurately identify coding parameters likely to provide good rate-distortion performance.

Otherwise, the encoder makes (890) an encoding decision based upon the previous distortion estimate(s). For example, the encoder reviews one or more of the previous distortion estimate(s), determines the lowest distortion estimate, and adopts coding parameter(s) used to produce the transform coefficients with the lowest distortion estimate.

Instead of evaluating distortion estimates for different coding parameters on a block-by-block basis, alternatively, an encoder can evaluate distortion estimates for different coding parameters on some other basis.

3. Distortion Estimation in Video Transcoding

As another example, a video transcoder estimates sample-domain distortion from transform coefficients with rounding compensation in transcoding operations. A video transcoder converts encoded video in one format and bit rate to encoded video in another format and/or bit rate. In "homogeneous" transcoding, a transcoder converts encoded video from a bit stream of a particular format at a first bit rate to a bit stream of the same format at a lower bit rate. In "heterogeneous" transcoding, a transcoder converts encoded video to a different format.

In one example of homogeneous transcoding, a transcoder uses distortion estimation with rounding compensation when selecting a quantization step size for a block in transcoded video. The transcoder applies different quantization step sizes and estimates pixel-domain distortion relative to the transform coefficients of the block of the original, encoded video. For a given quantization step size, after inverse quantization the transcoder gets a block of de-quantized transform coefficients and performs rounding compensation on one or more of them. The transcoder computes a distortion metric that compares transform coefficients from the first encoded video with the rounding-compensated transform coefficient(s) and other de-quantized transform coefficients the transcoder got for the evaluated quantization step size. The transcoder reviews the distortion estimates and stops the evaluation process if it finds a quantization step size for the block that gives good rate-distortion performance for encoding at the lower bit rate. If the tool continues, the tool gets a block of transform coefficients for different quantization step size.

For heterogeneous transcoding, a transcoder can use rounding compensation as in the homogeneous transcoding case, also using a scaling factor to account for energy differences between transform coefficients in the first format and transform coefficients in the second format.

4. Distortion Estimation in Image Classification

As another example, an image classification tool estimates sample-domain distortion from transform coefficients with rounding compensation in analysis and classification operations. For example, the tool determines how closely a first compressed image matches a second compressed image. To do this without fully decompressing each image, the tool compares transform coefficients from the first image to corresponding transform coefficients from the second image. By using rounding compensation, the tool accounts for rounding that would occur in an inverse frequency transform, thereby more accurately estimating pixel-domain distortion (here, differences between the two images). After comparing transform coefficients for blocks or other sections of the images, the image classification tool reviews distortion estimate(s) and makes a classification decision on how closely two images match. The image classification tool then outputs the classification decision to a file or screen.

Or, the image classification tool determines how closely an image matches an image signature or image pattern, comparing rounding-compensated transform coefficients of the image to the image signature or image pattern.

D. Computing Rounding Offset Tables

Figure 9:
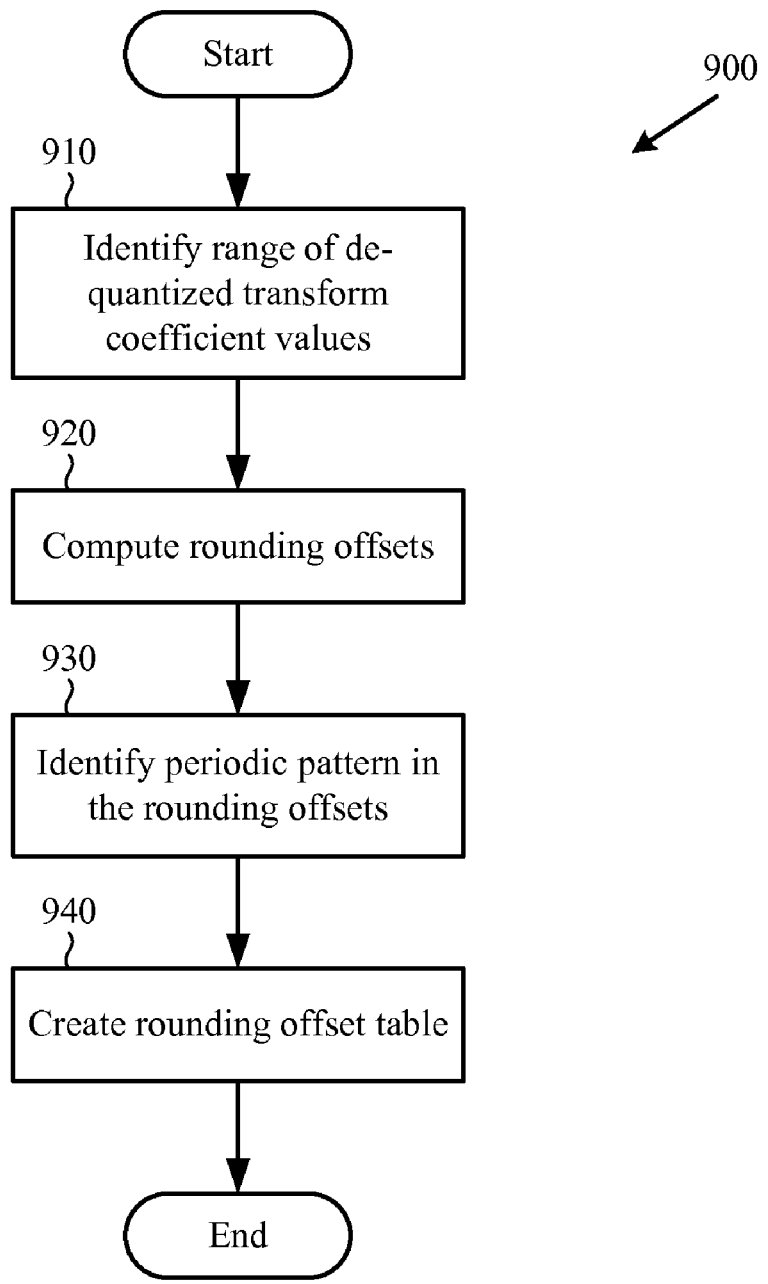
FIG. 9 is a flowchart of a technique for creating a rounding offset table.

FIG. 9 shows a technique (900) for computing a rounding offset table. A person, team, or other entity developing a tool such as the encoder shown in FIG. 5 performs the technique (900). Typically, the technique (900) is performed off-line, and the table is used thereafter during encoding or other operations.

To start, a range of de-quantized transform coefficient values is identified (910). In an example implementation, the range of samples is [0 ... 255] and, following an 8×8 forward frequency transform, quantization, and inverse quantization, the range of de-quantized DC coefficients is [−1816 ... 1816]. More specifically, $\hat{X}^{rc}(0,0)$ can take the value of any even integer in the range of [−1816 ... 1816]—odd integers are not possible due to the rules applied in inverse quantization. In different implementations, the range of values for de-quantized transform coefficients is different or the transform size is different. Different ranges of input sample values typically result in different ranges of de-quantized transform coefficient values. Depending on size (e.g., 4×4, 4×4, or 8×4) or type, different transforms often have different scaling factors, which also results in different ranges of de-quantized transform coefficient values. Finally, different quantization and inverse quantization rules affect which de-quantized transform coefficient values are possible within a range. Although only even values are possible in the immediately preceding example implementation, the approach can be applied to non-integer quantization parameters ("QPs") in which QPs can have ½-step increments. In this case, reconstructed DC coefficients can have odd values.

Next, rounding offsets for the de-quantized transform coefficient values in the range are computed (920). In the example implementation, the rounding offsets for DC coefficient values are computed and stored in a table labeled DCOFFSET[ ]. For each de-quantized coefficient value k in the identified range (here, even numbers in the range of [−1816 . . . 1816]), an inverse frequency transform is performed on a block having that value as its DC coefficient and zeros for all AC coefficients. A forward frequency transform is performed on the result. The difference is then computed between the DC coefficient of the forward transform results and the initial de-quantized coefficient value k. (To compensate for scaling in the transforms in some implementations, k is multiplied by a scaling factor.) The following equation yields rounding offset values for quantized coefficient values from −1816 to 1816, which can be stored in an array DCOFFSET.

$$DCOFSET\left[\frac{k+1816}{2}\right] = \left(DC \text{ coefficient of } T(T^{-1}(\hat{X}_k))\right) - (k \times 16),$$

where $\hat{X}_k$ is a block of de-quantized transform coefficients having a value of k for the DC coefficient and a value of zero for each AC coefficient. The following table shows example values of k and corresponding rounding offsets.

TABLE 1

DC Rounding Offsets in Example Implementation for Scaling Factor = 16

| k | DC coeff. of $T(T^{-1}(\hat{X}_k))$ | k × 16 | rounding offset |
|---|---|---|---|
| −1816 | −29014 | −29056 | 42 |
| −1814 | −29014 | −29024 | 10 |
| −1812 | −29014 | −28992 | −22 |
| −1810 | −29014 | −28960 | −54 |
| −1808 | −28900 | −28928 | 28 |
| −1806 | −28900 | −28896 | −4 |
| −1804 | −28900 | −28864 | −36 |
| −1802 | −28786 | −28832 | 46 |
| −1800 | −28786 | −28800 | 14 |
| −1798 | −28786 | −28768 | −18 |
| −1796 | −28786 | −28736 | −50 |
| −1794 | −28672 | −28704 | 32 |
| −1792 | −28672 | −28672 | 0 |
| −1790 | −28672 | −28640 | −32 |
| −1788 | −28559 | −28608 | 49 |
| −1786 | −28559 | −28576 | 17 |
| −1784 | −28559 | −28544 | −15 |
| −1782 | −28559 | −28512 | −47 |
| −1780 | −28445 | −28480 | 35 |
| −1778 | −28445 | −28448 | 3 |
| −1776 | −28445 | −28416 | −29 |
| −1774 | −28331 | −28384 | 53 |
| −1772 | −28331 | −28352 | 21 |
| −1770 | −28331 | −28320 | −11 |
| −1768 | −28331 | −28288 | −43 |

TABLE 1-continued

DC Rounding Offsets in Example Implementation for Scaling Factor = 16

| k | DC coeff. of $T(T^{-1}(\hat{X}_k))$ | k × 16 | rounding offset |
|---|---|---|---|
| −1766 | −28217 | −28256 | 39 |
| −1764 | −28217 | −28224 | 7 |
| −1762 | −28217 | −28192 | −25 |
| −1760 | −28104 | −28160 | 56 |
| −1758 | −28104 | −28128 | 24 |
| −1756 | −28104 | −28096 | −8 |
| −1754 | −28104 | −28064 | −40 |
| −1752 | −27990 | −28032 | 42 |
| −1750 | −27990 | −28000 | 10 |
| −1748 | −27990 | −27968 | −22 |
| −1746 | −27990 | −27936 | −54 |
| −1744 | −27876 | −27904 | 28 |
| . . . | . . . | . . . | . . . |
| 1808 | 28899 | 28928 | −29 |
| 1810 | 29013 | 28960 | 53 |
| 1812 | 29013 | 28992 | 21 |
| 1814 | 29013 | 29024 | −11 |
| 1816 | 29013 | 29056 | −43 |

In other implementations, the scaling factor of 16 is not needed since normalization is completed in the inverse and forward transforms. The scaling factor of 16 is not incorporated in the computation of rounding offsets, and the following equation yields rounding offset values for quantized coefficient values from −1816 to 1816, which can be stored in an array DCOFFSET.

$$DCOFFSET\left[\frac{k+1816}{2}\right] = \left(DC \text{ coefficient of } T(T^{-1}(\hat{X}_k))\right) - k.$$

Thus, for example, if the DC coefficient is −1816, −1814, −1812, or −1810, the inverse transform produces a residual block of with values −255, after rounding, and applying the forward transform to such blocks produces DC coefficients of −1813. The following table shows example values of k and corresponding rounding offsets.

TABLE 2

DC Rounding Offsets in Example Implementation with No Scaling Factor

| k | DC coeff. of $T(T^{-1}(\hat{X}_k))$ | k × 1 | rounding offset |
|---|---|---|---|
| −1816 | −1813 | −1816 | 3 |
| −1814 | −1813 | −1814 | 1 |
| −1812 | −1813 | −1812 | −1 |
| −1810 | −1813 | −1810 | −3 |
| −1808 | −1806 | −1808 | 2 |
| −1806 | −1806 | −1806 | 0 |
| −1804 | −1806 | −1804 | −2 |
| −1802 | −1799 | −1802 | 3 |
| −1800 | −1799 | −1800 | 1 |
| −1798 | −1799 | −1798 | −1 |
| −1796 | −1799 | −1796 | −3 |
| −1794 | −1792 | −1794 | 2 |
| −1792 | −1792 | −1792 | 0 |
| −1790 | −1792 | −1790 | −2 |
| −1788 | −1785 | −1788 | 3 |
| −1786 | −1785 | −1786 | 1 |
| −1784 | −1785 | −1784 | −1 |
| −1782 | −1785 | −1782 | −3 |
| −1780 | −1778 | −1780 | 2 |
| −1778 | −1778 | −1778 | 0 |
| −1776 | −1778 | −1776 | −2 |

TABLE 2-continued

DC Rounding Offsets in Example Implementation with No Scaling Factor

| k | DC coeff. of $T(T^{-1}(\hat{X}_k))$ | k × 1 | rounding offset |
|---|---|---|---|
| −1774 | −1771 | −1774 | 3 |
| −1772 | −1771 | −1772 | 1 |
| −1770 | −1771 | −1770 | −1 |
| −1768 | −1771 | −1768 | −3 |
| −1766 | −1764 | −1766 | 2 |
| −1764 | −1764 | −1764 | 0 |
| −1762 | −1764 | −1762 | −2 |
| −1760 | −1756 | −1760 | 4 |
| −1758 | −1756 | −1758 | 2 |
| −1756 | −1756 | −1756 | 0 |
| −1754 | −1756 | −1754 | −2 |
| −1752 | −1749 | −1752 | 3 |
| −1750 | −1749 | −1750 | 1 |
| −1748 | −1749 | −1748 | −1 |
| −1746 | −1749 | −1746 | −3 |
| −1744 | −1742 | −1744 | 2 |
| ... | ... | ... | ... |
| 1808 | 1806 | 1808 | −2 |
| 1810 | 1813 | 1810 | 3 |
| 1812 | 1813 | 1812 | 1 |
| 1814 | 1813 | 1814 | −1 |
| 1816 | 1813 | 1816 | −3 |

Alternatively, another mechanism is used to compute rounding offsets for the de-quantized transform coefficient values in the identified range.

Different ranges and transforms/inverse transforms result in different rounding offsets. For example, if odd values of reconstructed DC coefficients are possible (due to non-integer QPs or otherwise), the offsets of the DCOFFSET[ ] table include offsets for odd DC values.

Table 2 shows example values of k and corresponding rounding offsets for a generalized and idealized example in which the range of de-quantized transform coefficient values is any integer and the scaling factor for the transform/inverse transform is 1.

TABLE 3

DC Rounding Offsets in Generalized Example

| k | DC coeff. of $T(T^{-1}(\hat{X}_k))$ | k × 1 | rounding offset |
|---|---|---|---|
| ... | ... | ... | ... |
| −3 | −5 | −3 | −2 |
| −2 | 0 | −2 | 2 |
| −1 | 0 | −1 | 1 |
| 0 | 0 | 0 | 0 |
| 1 | 0 | 1 | −1 |
| 2 | 0 | 2 | −2 |
| 3 | 5 | 3 | 2 |
| 4 | 5 | 4 | 1 |
| 5 | 5 | 5 | 0 |
| 6 | 5 | 6 | −1 |
| 7 | 5 | 7 | −2 |
| 8 | 10 | 8 | 2 |
| 9 | 10 | 9 | 1 |
| ... | ... | ... | ... |

A rounding offset table is then created (940). For example, the rounding offset table is an array that maps de-quantized transform coefficient values to corresponding rounding offset values. A tool looks up a rounding offset by direct indexing with the value of a de-quantized transform coefficient. Alternatively, the rounding offset table is represented with a different data structure.

Optionally, a periodic pattern in the rounding offset values is identified (930) before the rounding offset table is created.

For example, a person performing the technique (900) identifies a periodic pattern visually, by plotting rounding offsets versus de-quantized transform coefficient values, or using analytical software. In general, periodicity in the DC rounding offsets allows for reduction in table size. In the generalized, idealized example of Table 3, the DC rounding offset is periodic with a period of 5. In the example implementation of Table 1 or Table 2, the DC rounding offset is periodic with a period of 32. The array DCOFFSET[ ] stores the first 32 rounding offset values, and the length $N_{rounding}$ is 32. Specifically, the values in the DC rounding offset table are DCOFFSET[32]={42, 10, −22, −54, 28, −4, −36, 46, 14, −18, −50, 32, 0, −32, 49, 17, −15, −47, 35, 3, −29, 53, 21, −11, −43, 39, 7, −25, 56, 24, −8, −40}. To look up the correct DC rounding offset for a de-quantized DC coefficient, the de-quantized DC coefficient value is converted to a table index by an index mapping function $f(\cdot)$ as follows: $f(i)=((i+1816)>>1)$ & 31.

If the scaling factor of 16 is not incorporated in the computation of rounding offsets (see Table 2), the values in the table are DCOFFSET[32]={3, 1, −1, −3, 2, 0, −2, 3, 1, −1, −3, 2, 0, −2, 3, 1, −1, −3, 2, 0, −2, 3, 1, −1, −3, 2, 0, −2, 4, 2, 0, −2}.

The index-mapping function is different for different ranges of de-quantized transform coefficient values and different periodic patterns. The index-mapping function can use different operations, for example, computing "coefficient value" MOD "period." Different ranges of de-quantized transform coefficient values and different forward/inverse transforms result in different periodic patterns.

IV. Extensions

Although the techniques and tools described herein are in places presented in the context of video encoding, sample-domain distortion estimation from transform coefficients with rounding compensation may be applied to other data compression schemes in which an integer-based transform (especially a DCT-like transform) is used. For example, the techniques and tools may be applied when encoding images with an integer-based, DCT-like transform. In addition, as noted above, the techniques and tools may be applied in transcoding applications and image classification and analysis applications.

Finally, an encoder can use results of rounding compensation in operations other than distortion estimation. For example, an encoder groups quantized DC coefficient values using rounding offset information. The quantized DC coefficient values within a group have rounding offsets that make the values within the group equivalent for purposes of estimating distortion. In terms of the example of Table 1, the values −1816, −1814, −1812, and −1810 are grouped, since $T(T^{-1}(\cdot))$ of each of these values results in the same value (−29014). The values −1808, −1806, and −1804 are in a second group, and so on. The encoder can perform the grouping off-line. During entropy coding, if a first DC coefficient value in a group can be represented with fewer bits than a second DC coefficient value in the same group, the encoder uses the first DC coefficient value instead of the second DC coefficient value in the encoded data.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. An encoder comprising:
    a frequency transformer for applying a frequency transform to convert samples in a sample domain into transform coefficients in a transform domain;
    a quantizer for quantizing the transform coefficients;
    an entropy encoder for entropy encoding the quantized transform coefficients;
    an inverse quantizer for de-quantizing the quantized transform coefficients;
    a rounding compensation module for adding a rounding offset to the de-quantized transform coefficients; and
    a controller for making encoding decisions after considering post-inverse frequency transform rounding effects on de-quantized transform coefficient values, wherein the controller includes a module for estimating pixel-domain distortion between original transform coefficients of a block and corresponding de-quantized transform coefficients of the block in the transform domain after the rounding compensation module adds the rounding offset by compensating for rounding in at least one of the corresponding de-quantized transform coefficients of the block and computing the estimated pixel-domain distortion using the original transform coefficients of the block, the at least one rounding-compensated coefficient and other coefficients of the de-quantized transform coefficients of the block.

2. The encoder of claim 1 further comprising a table for use in the compensating by, for each of the at least one rounding-compensated coefficient:
    determining an index from the coefficient;
    looking up the index in the table to determine a corresponding offset; and
    adjusting the coefficient by the corresponding offset.

3. The encoder of claim 1 wherein the encoding decisions are based at least in part on the estimated pixel-domain distortion.

4. The encoder of claim 1 wherein the encoding decisions comprise setting coding parameters for two or more of intra/inter encoding, quantization dead zone size, transform size, number of motion vectors, motion vector value, perceptual quantization, quantization thresholding, and quantization step size.

5. The encoder of claim 1 wherein the rounding effects indicate multiple values in a group of the de-quantized transform coefficient values affect distortion equivalently, and wherein the encoding decisions comprise selecting between the multiple values based on bits required for the multiple values respectively.

6. A method comprising:
    identifying a range of values for a de-quantized transform coefficient;
    computing a rounding offset for each of plural values in the range;
    identifying a periodic pattern in the computed rounding offsets;
    mapping representative values to corresponding rounding offsets in an offset table, wherein the corresponding rounding offsets show at least one period of the pattern without the offset table including all values in the range; and
    storing the offset table.

7. The method of claim 6 further comprising distributing the offset table with a video encoder.

8. The method of claim 6, wherein the offset table maps representative de-quantized values to representative offsets for less than all of the de-quantized values.

9. The method of claim 6 further including:
    determining an index from a first coefficient;
    determining an offset by looking up the index in the offset table; and
    adjusting the first coefficient by the offset.

10. A method comprising:
    identifying a range of values for a de-quantized transform coefficient;
    computing a rounding offset for plural values in the range;
    identifying a periodic pattern in the computed rounding offsets; and
    mapping representative values to corresponding rounding offsets in an offset table, wherein the corresponding rounding offsets show at least one period of the periodic pattern without the offset table including all values in the range.

11. The method of claim 10, further comprising distributing the offset table with a video encoder and storing the offset table.

12. The method of claim 10, wherein the offset table maps representative de-quantized values to representative offsets for less than all of the de-quantized values.

13. The method of claim 10, further including:
    determining an index from a first coefficient;
    determining an offset by looking up the index in the offset table; and
    adjusting the first coefficient by the offset.

* * * * *